US012722687B2

(12) United States Patent
Allen et al.

(10) Patent No.: US 12,722,687 B2
(45) Date of Patent: Sep. 1, 2026

(54) REDUNDANT HYDRAULIC SYSTEM

(71) Applicants: Parker Hannifin EMEA S.à.r.l., Etoy (CH); Parker-Hannifin Corporation, Cleveland, OH (US)

(72) Inventors: Dennis Allen, Eagle River, WI (US); Tommy Claeson, Fristad (SE); Johan Hansson, Stenstorp (SE)

(73) Assignees: Parker Hannfin EMEA S.à.r.l., Etoy (CH); Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 18/692,093

(22) PCT Filed: Sep. 9, 2022

(86) PCT No.: PCT/EP2022/075162

§ 371 (c)(1),
(2) Date: Mar. 14, 2024

(87) PCT Pub. No.: WO2023/041444

PCT Pub. Date: Mar. 23, 2023

(65) Prior Publication Data

US 2024/0384733 A1 Nov. 21, 2024

Related U.S. Application Data

(60) Provisional application No. 63/245,216, filed on Sep. 17, 2021.

(51) Int. Cl.
*B62D 5/00* (2006.01)
*B62D 5/09* (2006.01)
(Continued)

(52) U.S. Cl.
CPC ............. *B62D 5/003* (2013.01); *B62D 5/091* (2013.01); *F15B 13/043* (2013.01); *F15B 13/08* (2013.01); *F15B 2211/8757* (2013.01)

(58) Field of Classification Search
CPC ......... B62D 5/003; B62D 5/091; F15B 13/08; F15B 2211/8757
See application file for complete search history.

(56) References Cited

U.S. PATENT DOCUMENTS 3,215,158 A * 11/1965 Bass, Jr. ................ F15B 13/08
137/625.69
3,759,292 A * 9/1973 Bianchetta ............ E02F 9/2296
137/596

(Continued)

FOREIGN PATENT DOCUMENTS

WO 2018074952 A1 4/2018

OTHER PUBLICATIONS

International Search Report and Written Opinion issued for corresponding International Patent Application No. PCT/EP2022/075162, mailed Jan. 17, 2023.

*Primary Examiner* — Matthew Wiblin
(74) *Attorney, Agent, or Firm* — Renner, Otto, Boisselle & Sklar, LLP

(57) ABSTRACT

A hydraulic system comprising: a hydraulic fluid pressure source, a hydraulic fluid reservoir, a hydraulically driven actuator having a first chamber and a second chamber, and a valve assembly having a first pilot-operated directional control valve and a second pilot-operated directional control valve, each including: an inlet port fluidly connected for receiving high-pressure hydraulic fluid from the hydraulic fluid pressure source, an outlet port fluidly connected for draining hydraulic fluid to the hydraulic fluid reservoir, a first actuator port fluidly coupled with the first chamber of the hydraulically driven actuator, a second actuator port fluidly coupled with the second chamber of the hydraulically driven actuator; first to fourth fail-safe solenoid-controlled pilot valves; and a pilot pressure fluid supply system.

18 Claims, 12 Drawing Sheets

(51) Int. Cl.
*F15B 13/043* (2006.01)
*F15B 13/08* (2006.01)

(56) References Cited

U.S. PATENT DOCUMENTS

| | | | | | |
|---|---|---|---|---|---|
| 3,774,635 | A * | 11/1973 | Farrell | F15B 11/163 137/625.68 |
| 3,813,990 | A * | 6/1974 | Coppola | F15B 9/03 91/20 |
| 6,067,782 | A | 5/2000 | Diekhans | |
| 6,102,150 | A | 8/2000 | Bohner et al. | |
| 7,770,687 | B2 * | 8/2010 | Entwistle | B62D 5/003 180/417 |
| 8,322,375 | B2 | 12/2012 | Helbling et al. | |
| 11,125,254 | B2 * | 9/2021 | Erikksson | F15B 13/0435 |
| 2006/0124381 | A1 * | 6/2006 | Kuhn | B62D 5/091 180/435 |
| 2009/0044872 | A1 * | 2/2009 | Helbling | F15B 13/0433 137/535 |
| 2019/0257328 | A1 * | 8/2019 | Erikksson | F15B 20/008 |

* cited by examiner 73
31
79
71
78
68
82
64

70
69
80
84
24
63
58
23
83
72
76
74
81
62
22
75
77
73
31
79
71
78
68
82
64

70
69
80
84
24
63
58
23
83
72
76
74
81
62
22
75
77

REDUNDANT HYDRAULIC SYSTEM

This application is a national phase of International Application No. PCT/EP2022/075162 filed Sep. 9, 2022, which claims priority to U.S. Provisional Patent Application No. 63/245,216 filed Sep. 17, 2021, each of which is hereby incorporated herein by reference in its entirety.

TECHNICAL FIELD

The present disclosure relates to redundant hydraulic system. The disclosure further relates to a method for operating a hydraulically driven actuator of a redundant hydraulic system.

The redundant hydraulic system according to the disclosure can be arranged in for example various safety-critical hydraulic applications, where redundancy is a tool for reducing risk for total system failure. For example, a redundant hydraulic system according to the disclosure can be used for vehicle hydraulic-operated steer-by-wire solutions. However, Moreover, even if the redundant hydraulic system according to the disclosure will be described primarily in relation to steering of an articulated vehicle, the redundant hydraulic system not restricted to this particular application, but may alternatively be installed or implemented in other type of applications where high operational reliability is desired.

BACKGROUND

In the field of redundant hydraulic systems having a hydraulic actuator controlled by a directional control valve, various designs are available. For example, document WO2018074952A1 shows a hydraulic system having redundant pilot valves for controlling operation of a pilot-operated directional control valve. However, even of the knowns design solutions provide good reliability and redundancy, there is a demand for further improved redundancy and operational reliability, as well as further increased hydraulic flow capacity for better serving applications with large hydraulic actuators that need relatively high displacement speed. There is also a demand for maintained cost-efficiency and scalable flow capacity for meeting the requirements and circumstances of each specific implementation.

SUMMARY

An object of the present disclosure is to provide a redundant hydraulic system where the previously mentioned problems are avoided. This object is at least partly achieved by the features of the independent claims.

According to a first aspect of the present disclosure, there is provided a redundant hydraulic system comprising: a hydraulic fluid pressure source, a hydraulic fluid reservoir, a hydraulically driven actuator having a first chamber and a second chamber, and a redundant sectional or monoblock valve assembly having a first pilot-operated directional control valve and a second pilot-operated directional control valve. Each of the first and second pilot-operated directional control valves includes an inlet port fluidly connected for receiving high-pressure hydraulic fluid from the hydraulic fluid pressure source, an outlet port fluidly connected for draining hydraulic fluid to the hydraulic fluid reservoir, a first actuator port (A) fluidly coupled with the first chamber of the hydraulically driven actuator, a second actuator port (B) fluidly coupled with the second chamber of the hydraulically driven actuator, and a pilot operated flow control spool arranged in a spool bore. The hydraulic system further comprises a first fail-safe solenoid-controlled pilot valve operably connected to the first directional control valve and configured for driving the flow control spool in a first direction, a second fail-safe solenoid-controlled pilot valve operably connected to the first directional control valve and configured for driving the flow control spool in a second direction, a third fail-safe solenoid-controlled pilot valve operably connected to the second directional control valve and configured for driving the flow control spool in the first direction, and a fourth fail-safe solenoid-controlled pilot valve operably connected to the second directional control valve and configured for driving the flow control spool in the second direction. Finally, the hydraulic system additionally comprises a redundant pilot pressure fluid supply system having a first pilot pressure fluid supply line and a second pilot pressure fluid supply line configured for supplying pilot pressure fluid to the first to fourth fail-safe solenoid-controlled pilot valves, wherein each of the first to fourth fail-safe solenoid-controlled pilot valves has a drain passage that is configured to automatically open for enabling automatic drainage of pilot pressure fluid supplied from the pilot pressure fluid supply system in the event a pilot spool of the associated fail-safe solenoid-controlled pilot valve is stuck in an actuated state.

According to a second aspect of the present disclosure, there is provided a method for operating a hydraulically driven actuator of a redundant hydraulic system. The method comprises: providing a hydraulic system that comprises a hydraulic actuator; a first pilot-operated directional control valve connected to the hydraulic actuator and a second pilot-operated directional control valve also connected to the hydraulic actuator; first and second fail-safe solenoid-controlled pilot valves operatively connected to the first pilot-operated directional control valve, and third and fourth fail-safe solenoid-controlled pilot valves operatively connected to the second pilot-operated directional control valve; energizing a solenoid of the first fail-safe solenoid-controlled pilot valve for displacing an associated pilot spool forwards, such that a flow passage opens that supplies pilot pressure fluid from a redundant pilot pressure fluid supply system to a first longitudinal end of a flow control spool of the first directional control valve, and such that high-pressure hydraulic fluid from an external hydraulic fluid pressure source is routed to a first chamber of the hydraulically driven actuator via the first directional control valve, and substantially simultaneously energizing a solenoid of the third fail-safe solenoid-controlled pilot valve for displacing an associated pilot spool forwards, such that a flow passage opens that supplies pilot pressure fluid from the redundant pilot pressure fluid supply system to a first longitudinal end of a flow control spool of the second directional control valve, and such that high-pressure hydraulic fluid from the external hydraulic fluid pressure source is routed to said first chamber of the hydraulically driven actuator via the second directional control valve; and stopping energizing the solenoid of the first fail-safe solenoid-controlled pilot valve, and substantially simultaneously stopping energizing the solenoid of the third fail-safe solenoid-controlled pilot valve, wherein subsequent rearwards motion of a plunger of the solenoid of the first fail-safe solenoid-controlled pilot valve causes opening of a drain passage in the first fail-safe solenoid-controlled pilot valve for enabling automatic drainage of pilot pressure fluid supplied from the pilot pressure fluid supply system in the event the associated pilot spool is stuck in an actuated state, and wherein subsequent rearwards motion of a plunger of the solenoid of the third fail-safe solenoid-controlled pilot valve causes opening of a drain passage in the third fail-safe solenoid-controlled pilot valve in the event the associated pilot spool is stuck in an actuated state.

According to a third aspect of the present disclosure, there is provided a hydraulic system for activating a hydraulic consumer having a first consumer port and a second consumer port, the system comprising: a valve assembly having a pressure source inlet port, a reservoir port, a first pilot-operated directional control valve and a second pilot-operated directional control valve, each pilot-operated directional control valve including: a first port fluidly connected to the pressure source inlet port, a second port fluidly connected to the reservoir port, a third port fluidly connected to the first consumer port, a second port fluidly connected to the second consumer port, and a pilot operated flow control spool arranged in a spool bore; a first fail-safe solenoid-controlled pilot valve operably connected to the first directional control valve and configured for driving the flow control spool in a first direction; a second fail-safe solenoid-controlled pilot valve operably connected to the first directional control valve and configured for driving the flow control spool in a second direction; a third fail-safe solenoid-controlled pilot valve operably connected to the second directional control valve and configured for driving the flow control spool in the first direction; a fourth fail-safe solenoid-controlled pilot valve operably connected to the second directional control valve and configured for driving the flow control spool in the second direction; and a pilot pressure fluid supply system having a first pilot pressure fluid supply line and a second pilot pressure fluid supply line configured for supplying pilot pressure fluid to the first to fourth fail-safe solenoid-controlled pilot valves; wherein each of the fail-safe solenoid-controlled pilot valves has a drain passage that is configured to automatically open for enabling automatic drainage of pilot pressure fluid supplied from the pilot pressure fluid supply system in the event a pilot spool of the associated fail-safe solenoid-controlled pilot valve is stuck in an actuated state.

In this way, it is relatively easy to adapt the hydraulic flow capacity [litre per minute] of the redundant valve assembly by simply including a suitable number of pilot-operated directional control valves connected in parallel and operating in parallel for supplying high pressure fluid to the same hydraulic actuator. Hence, the level of redundancy is easily adjustable no matter what flow capacity is needed.

For example, if a redundant high flow capacity steer-by-wire design is required, requiring for example 120 litre/minute flow capacity to each of two hydraulic steering actuators, and a single pilot-operated directional control valve has a maximal flow supply of 150 litres/minute, then a redundant valve assembly having two such pilot-operated directional control valves may be connected in parallel for redundant supply of high pressure fluid to each hydraulic steering actuator, because the steering functionality would be fully maintained also in the event that one of said two pilot-operated directional control valves would stop supply for any reason.

Furthermore, the fact that each of said two pilot-operated directional control valves are controlled by two individual solenoid-controlled pilot valves, malfunction of one of the solenoid-controlled pilot valve would merely cause malfunction of one of the two pilot-operated directional control valves.

Moreover, by designing each of said individual solenoid-controlled pilot valves as fail-safe valve that includes an automatic drainage of the pilot pressure fluid supplied from the pilot pressure fluid supply system in the event a pilot spool of the associated fail, a stuck pilot spool will not cause the associated pilot-operated directional control valve to be locked in a fully actuated state, thereby eliminating the absolute need for a valve and/or electronic control system configured for actively selectively setting one of the first and second pilot-operated directional control valves in an active state and/or setting the other of the first and second pilot-operated directional control valves in a non-active state in response to a detected malfunction. Instead, the electronic control system may in fact continue operating as before, without changing the operating behaviour, thereby requiring significantly less system diagnose and error detection.

In addition, the redundant pilot pressure fluid supply system having a first pilot pressure fluid supply line and a second pilot pressure fluid supply line configured for supplying pilot pressure fluid to the first to fourth fail-safe solenoid-controlled pilot valves effectively prevents total failure due to malfunction of one of said pilot pressure fluid supply lines.

Finally, by providing the first and second pilot-operated directional control valves in form of a redundant sectional or monoblock valve assembly, a very compact, modular and scalable design is accomplished, because the number of pilot-operated directional control valves with associated two individual solenoid-controlled pilot valves may be easily adapted to the specific circumstances of each application.

In other words, the redundant hydraulic system and associated method enables improved redundancy and operational reliability, further increased hydraulic flow capacity, maintained cost-efficiency and scalable flow capacity for meeting the requirements and circumstances of each specific implementation Further advantages are achieved by implementing one or several of the features of the dependent claims.

In some example embodiments, the hydraulic system further comprises an electronic control system configured for operating the first and third pilot valves in parallel, and for operating the second and fourth pilot valves in parallel. By operating said pilot valves in parallel, any malfunctions in a pilot valve or directional control valve does not negatively influence operation of the hydraulic actuator, thereby providing a robust redundant hydraulic system that is not requiring monitoring of operational health and/or specific active control for handling such an malfunction. Instead, the hydraulic system may simply be operated as before the malfunction.

In some example embodiments, the hydraulic system comprises an electronic control system that is configured for operating the first and second pilot-operated directional control valves in parallel. By operating said directional control valves in parallel, any malfunctions in a pilot valve or directional control valve does not negatively influence operation of the hydraulic actuator, thereby providing a robust redundant hydraulic system.

In some example embodiments, the electronic control system is configured for simultaneously supplying same control signals to both the first and third pilot valves, and for simultaneously supplying same control to both the second and fourth pilot valves. By simultaneously supplying same control signals to said pilot valves, any malfunctions in a pilot valve or directional control valve does not negatively influence operation of the hydraulic actuator, thereby providing a robust redundant hydraulic system.

In some example embodiments, an inlet port of each of the first and second fail-safe solenoid-controlled pilot valves is connected to the first pilot pressure fluid supply line, and an inlet port of each of the third and fourth fail-safe solenoid-controlled pilot valves is connected to the second pilot pressure fluid supply line. As a result, malfunction of one of said pilot pressure fluid supply lines does not does not negatively influence operation of the hydraulic actuator, thereby providing a robust redundant hydraulic system.

In some example embodiments, the first pilot pressure fluid supply line is connected to a first input port of a shuttle valve and the second pilot pressure fluid supply line is connected to a second input port of the shuttle valve, and an inlet port of each of the first to fourth fail-safe solenoid-controlled pilot valves is connected to an outlet port of the shuttle valve. As a result, malfunction of one of said pilot pressure fluid supply lines does not does not negatively influence operation of the hydraulic actuator, thereby providing a robust redundant hydraulic system.

In some example embodiments, the redundant pilot pressure fluid supply system comprises a first pressure reducing valve configured for supplying pilot pressure fluid to the first pilot pressure fluid supply line, and a second pressure reducing valve configured for supplying pilot pressure fluid to the second pilot pressure fluid supply line. Thereby, the necessary pilot fluid is provided in a cost-efficient and self-contained package.

In some example embodiments, an inlet port of each of the first and second pressure reducing valves is fluidly connected for receiving high-pressure hydraulic fluid from the hydraulic fluid pressure source, or for receiving pilot pressure fluid from a dedicated pilot pressure pump.

In some example embodiments, the hydraulic system is free from a valve and/or electronic control system configured for actively selectively setting one of the first and second pilot-operated directional control valves in an active state and/or setting the other of the first and second pilot-operated directional control valves in a non-active state in response to a detected malfunction of a part of the hydraulic system. As a result, there is no absolute need for monitoring the operational health and to provide the hydraulic system with a dedicated selector valve for activating/deactivating certain parts of the system.

In some example embodiments, a connection point connecting the first actuator port (A) of the first pilot-operated directional control valve with the first actuator port (A) of the second pilot-operated directional control valve is located within the valve assembly, in particular within an input section or end section, or outside of the valve assembly.

In some example embodiments, the first and second pilot-operated directional control valves have the same design and functionality. This improves scalability and flexibility of the system.

In some example embodiments, the valve assembly is a redundant sectional valve assembly, wherein the first pilot-operated directional control valve is assembled in a first individual work section, wherein the second pilot-operated directional control valve is assembled in a second individual work section, wherein each of the first and second work sections include said inlet port fluidly connected for receiving high-pressure hydraulic fluid from the hydraulic fluid pressure source, said outlet port fluidly connected for draining hydraulic fluid to the hydraulic fluid reservoir, said first actuator port (A) fluidly coupled with the first chamber of the hydraulically driven actuator, said second actuator port (B) fluidly coupled with the second chamber of the hydraulically driven actuator, and said pilot operated flow control spool arranged in a spool bore, and wherein said first and second individual work sections are stacked and clamped together to provide the assembled sectional valve assembly.

A sectional valve assembly provides increased flexibility and scalability for providing a system that more easily can be adapted to the specific circumstances.

In some example embodiments, the sectional valve assembly further comprises a inlet section and an end section, wherein the inlet section, the first individual work section, the second individual work section and the end section are stacked and clamped together to provide the assembled sectional valve assembly, and wherein the inlet section and/or end section includes an inlet port and an outlet port.

In some example embodiments, the first and second pressure reducing valves and the shuttle valve is located in the inlet section.

In some example embodiments, the valve assembly is redundant monoblock valve assembly having a one-piece block with integrally formed inlet port and an outlet port, and with the first and second pilot-operated directional control valves formed either integrally in the block or clamped to a surface of the block.

The disclosure also relates to a vehicle comprising wheels and/or crawlers for facilitating movement of the vehicle and an solenoid-controlled control system as described above, wherein the at least one hydraulic actuator is configured to be used for steering the vehicle.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF DRAWINGS

The redundant hydraulic system according to the disclosure will be described in detail in the following, with reference to the attached drawings, in which FIG. 1-5 schematically show various example embodiments of the redundant hydraulic system according to the disclosure.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
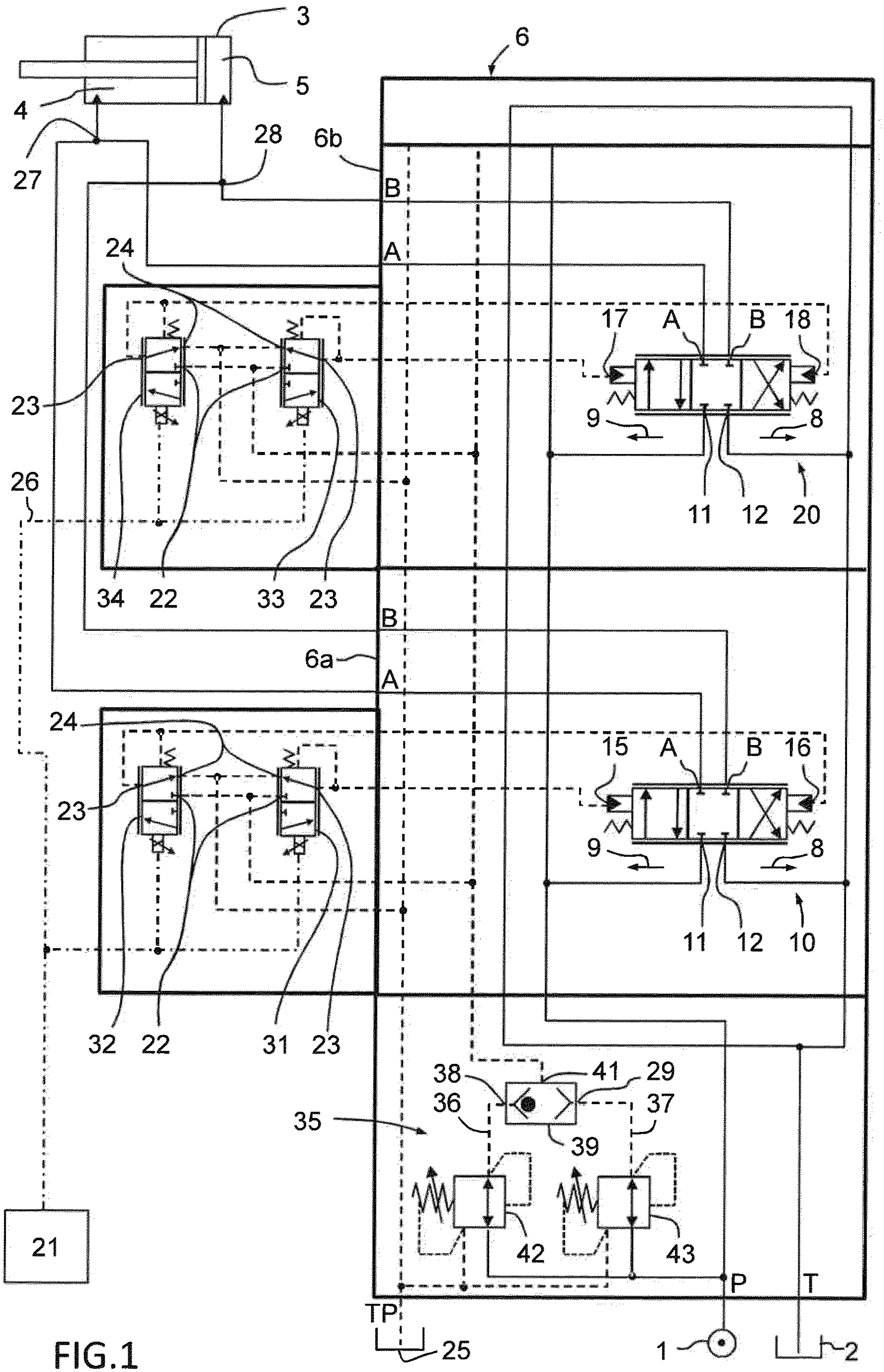

FIG. 1 schematically shows a first example embodiment of the redundant hydraulic system according to the disclosure. In this example embodiment, the redundant hydraulic system comprises a hydraulic fluid pressure source 1, a hydraulic fluid reservoir 2 and a hydraulically driven actuator 3 having a first chamber 4 and a second chamber 5. The redundant hydraulic system further comprises a redundant sectional or monoblock valve assembly 6 having a first pilot-operated directional control valve 10 and a second pilot-operated directional control valve 20, each including: an inlet port 11 fluidly connected for receiving high-pressure hydraulic fluid from the hydraulic fluid pressure source 1, an outlet port 12 fluidly connected for draining hydraulic fluid to the hydraulic fluid reservoir 2, a first actuator port A fluidly coupled with the first chamber 4 of the hydraulically driven actuator 3, a second actuator port B fluidly coupled with the second chamber 5 of the hydraulically driven actuator 3, and a pilot operated flow control spool arranged in a spool bore.

The redundant hydraulic system further comprises a first fail-safe solenoid-controlled pilot valve 31 operably connected to the first directional control valve 10 and configured for driving the flow control spool of the first directional control valve 10 in a first direction 8, a second fail-safe solenoid-controlled pilot valve 32 operably connected to the first directional control valve 10 and configured for driving the flow control spool of the first directional control valve 10 in a second direction 9, a third fail-safe solenoid-controlled pilot valve 33 operably connected to the second directional control valve 20 and configured for driving the flow control spool of the second directional control valve 20 in the first direction 8, and a fourth fail-safe solenoid-controlled pilot valve 34 operably connected to the second directional control valve 20 and configured for driving the flow control spool of the second directional control valve 20 in the second direction 9.

In addition, the redundant hydraulic system comprises a redundant pilot pressure fluid supply system 35 having a first pilot pressure fluid supply line 36 and a second pilot pressure fluid supply line 37 configured for supplying pilot pressure fluid to the first to fourth fail-safe solenoid-controlled pilot valves 31-34.

Moreover, each of the first to fourth fail-safe solenoid-controlled pilot valves 31-34 has a drain passage that is configured to automatically open for enabling automatic drainage of pilot pressure fluid supplied from the pilot pressure fluid supply system 35 in the event a pilot spool of the associated fail-safe solenoid-controlled pilot valve 31-34 is stuck in an actuated state.

Since each of the first to fourth fail-safe solenoid-controlled pilot valves 31-34 provides automatic draining of pressurized pilot fluid supplied from the pilot pressure fluid supply system 35 in the event of a stuck pilot spool of the associated pilot valve 31-34, the risk that one of the directional control valves 10, 20 become locked in a fully actuated operating state is eliminated, thereby enabling continued control of the hydraulic actuator even in the event of stuck pilot valve. Consequently, other measures conventionally used for stopping a directional control valve 10, 20 that has become locked in a fully actuated operating state from negatively affect control of the hydraulic actuator 3 may be omitted. Conventional solutions involved for example activation of some type of deactivation valve, selector valve, shut-off valve, change-over valve, or corresponding software solution, used for effectively cancelling a certain directional control valve. Moreover, conventional solutions typically required some type of monitoring solution for detecting a malfunctioning pilot valve, for enabling swift handling of the problem using cancellation of part of the hydraulic system.

Hence, by providing automatic fail-safe pilot valves, the hydraulic system may be less complex and more cost-efficient.

In other words, the hydraulic system may be made free from a valve, other that the fail-safe solenoid controlled pilot valves, and/or free from an electronic software function, configured for actively selectively setting one of the first and second pilot-operated directional control valves in an active state and/or substantially simultaneously setting the other of the first and second pilot-operated directional control valves in a non-active state in response to a detected malfunction of a part of the hydraulic system, thereby enabling improved cost-efficiency and operational reliability.

The hydraulic fluid pressure source 1 is for example a fixed or variable displacement pump. The hydraulic fluid pressure source 1 may alternatively include redundant hydraulic fluid pressure source system having first and second hydraulic pumps, or a single pump combined with another high pressure source, such as for example a hydraulic accumulator or a hydraulic motor that may be temporarily operated in a regenerative mode for serving as a pump.

The hydraulic fluid reservoir 2 may be a conventional low-pressure or ambient-pressure fluid tank.

The hydraulically driven actuator 3 is for example a linear cylinder, such as a double-acting cylinder, having first and second chambers 4, 5 divided by a cylinder piston. However, the hydraulically driven actuator 3 is not limited to a cylinder and may alternative correspond to for example a hydraulic motor, wherein the first chamber correspond to a motor inlet passage and a the second chamber corresponds to a motor outlet passage.

The pilot operated flow control spool of each of the first and second directional control valves 10, 20 may have a spring biased neutral position. Displacement of the flow control spool in the first direction 8 opens a flow path extending between the inlet port 11 and the first actuator port A, and wherein displacement of the flow control spool in the second direction 9 opens a flow path extending between the inlet port 11 and the second actuator port B. In other words, axial displacement of the flow control spool in the first direction 8 results in retraction of the piston of the actuator 3 and axial displacement of the flow control spool in the second direction 8 results in extension of the piston of the actuator 3.

The first and second directional control valves 10, 20 may be 4 way 3 position control valve as schematically depicted in FIG. 1, but the redundant hydraulic system according to the disclosure is not restricted to this type of control valve and many other types of directional control valves may alternatively be implemented.

In the example embodiment of FIG. 1, the first pilot pressure fluid supply line 36 is connected to a first input port 38 of a shuttle valve 39 and the second pilot pressure fluid supply line 37 is connected to a second input port 29 of the shuttle valve 39, and an inlet port 22 of each of the first to fourth fail-safe solenoid-controlled pilot valves 31-34 is connected to an outlet port 41 of the shuttle valve.

Each of the first to fourth fail-safe solenoid-controlled pilot valves 31-34, which may be referred to as proportional electro-hydraulic control valve, is configured for supplying a pilot pressure to an axial end of an associated flow control spool for displacing the flow control spool in the first or second direction 8, 9.

In the example embodiment of FIG. 1, the first pilot valve 31 has an outlet port 23 fluidly connected to a first pilot pressure port 15 of the first directional control valve 10 for controlling displacement of the floe control spool in the first axial direction 8, and the second pilot valve 32 has an outlet port 23 fluidly connected to a second pilot pressure port 16 of the first directional control valve 10 for controlling displacement of the flow control spool in the second axial direction 9.

Similarly, the third pilot valve 31 has an outlet port 23 fluidly connected to a first pilot pressure port 17 of the second directional control valve 20 for controlling displacement of the floe control spool in the first axial direction 8, and the fourth pilot valve 34 has an outlet port 23 fluidly connected to a second pilot pressure port 18 of the second directional control valve 20 for controlling displacement of the flow control spool in the second axial direction 9.

Each of the first to fourth pilot valves 31-34 further has a discharge port 24 fluidly connected to a tank 25, such as for example a dedicated pilot fluid tank, or the previously described hydraulic fluid reservoir 2.

Each of the first to fourth pilot valves 31-34 further has an electrical control signal port configured for receiving electrical control signals from the electronic control system 21 via a wired 26 or wireless data communication system.

The redundant valve assembly 6 schematically showed in FIG. 1 is a sectional valve assembly having two work sections 6*a*, 6*b*, namely the first and second pilot-operated directional control valve work sections 6*a*, 6*b*. These work sections are identical and enable a modular design of the valve assembly, and in this example embodiment each work section 6*a*, 6*b* has individual first and second actuator ports A, B accessible at the outer surface of each work section 6*a*, 6*b* for connection with a hydraulic consumer, such as a hydraulic actuator 3.

Consequently, since the first and second directional control valves 10, 20 are configured to operate in parallel, a fluid line connected to the first actuator port A of the first directional control valve 10 is connected at a first common connection point 27 with a fluid line that is connected to the first actuator port A of the second directional control valve 20, and a further fluid line connects the first common connection point 27 with the first chamber 4 of the hydraulic actuator 3. Similarly, a fluid line connected to the second actuator port B of the first directional control valve 10 is connected at a second common connection point 28 with a fluid line that is connected to the second actuator port B of the second directional control valve 20, and a further fluid line connects the second common connection point 28 with the second chamber 5 of the hydraulic actuator 3. Moreover, said first and second common connection points 27, 28 are located outside of the valve assembly 6.

The hydraulic system further comprises an electronic control system 21 for controlling operation of the first to fourth pilot valves 31-34. The an electronic control system 21 may for example be composed of a central electronic control unit or a plurality of individual interconnected control units. The steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). One or more data memories are included in the electronic control system for storing one or more programs that perform the steps, services and functions disclosed herein when executed by one or more processors of the electronic control unit(s).

For providing the desired operational redundancy, the electronic control system 21 is configured for operating the first and third pilot valves 31, 33 in parallel, and for operating the second and fourth pilot valves 32, 34 in parallel.

Hence, in the electronic control system 21 is configured for simultaneously supplying same control signals to both the first and third pilot valves 31, 33, and for simultaneously supplying same control to both the second and fourth pilot valves 32, 34.

In some implementations, the electronic control system 21 may however for any reason be configured for submitting substantially the same control signals to the first and third pilot valves 31, 33 at substantially the same time point, wherein the term substantially herein refers to possible minor differences in term of control signals and time point.

For example, the electronic control system 21 may be configured for supplying a certain control signal first to the first pilot valve 31 and after a short delay to the third pilot valve 33, for example if a smoother flow rate change is desired. Moreover, or alternatively, the electronic control system 21 may be configured for supplying a first control signal to the first pilot valve 31 and a second control signal to the third pilot valve 33, wherein the first and second control signals are substantially the same but may differ slightly, for example+/−10%, for certain reasons. However, the first and third pilot valves 31, 33 are still deemed working in parallel despite such relatively small deviations in signal character and timing, and the same applied to operating the second and fourth pilot valves 32, 34 in parallel.

As a consequence of operating the first and third pilot valves 31, 33 in parallel and operating the second and fourth pilot valves 32, 34 in parallel, the electronic control system 21 is configured for operating the first and second pilot-operated directional control valves 10, 20 in parallel.

For the purpose of providing the desired scalable flow capacity combined good cost-efficiency, the first and second pilot-operated directional control valves 10, 20 may have the same design and functionality, i.e. having an identical design. This enables easily scalable hydraulic system by merely selecting the number of directional control valves to be used in parallel for driving a certain hydraulic actuator.

Similarly, for the same reasons, each of the first to fourth pilot valves 31-34 may have the same design and functionality, i.e. having an identical design.

In the example embodiment of FIG. 1, the redundant pilot pressure fluid supply system comprises a first pressure reducing valve 42 configured for supplying pilot pressure fluid to the first pilot pressure fluid supply line 36, and a second pressure reducing valve 43 configured for supplying pilot pressure fluid to the second pilot pressure fluid supply line 37. The first and second pressure reducing valves 42, 43 are configured for providing a reliable pilot fluid supply within a certain pressure range suitable for being handled by the first to fourth pilot valves 31-34, and suitable for controlling displacement of the flow control spools of the first and second directional control valves 10, 20.

The first and second pressure reducing valves 42, 43 may be set to supply pilot fluid with the same pressure, or with a small different in pressure, such as for example 5%. In embodiment of the redundant pilot pressure fluid supply system 35 including a shuttle valve 39, as for example illustrated in FIG. 1, a certain different is pilot fluid pressure supplied by the first and second pressure reducing valves 42, 43 may be used for diagnosing the first and second pressure reducing valves 42, 43, because a small reduction of pilot pressure caused by malfunction of a higher pressure supplying pressure reducing valve 42, 43 may be detected by the electronic control system via for example a sensor configured for detecting actuating position of the flow control spool position.

In the example embodiment of FIG. 1, an inlet port of each of the first and second pressure reducing valves 42, 43 is fluidly connected for receiving high-pressure hydraulic fluid from the hydraulic fluid pressure source 1.

Figure 2:
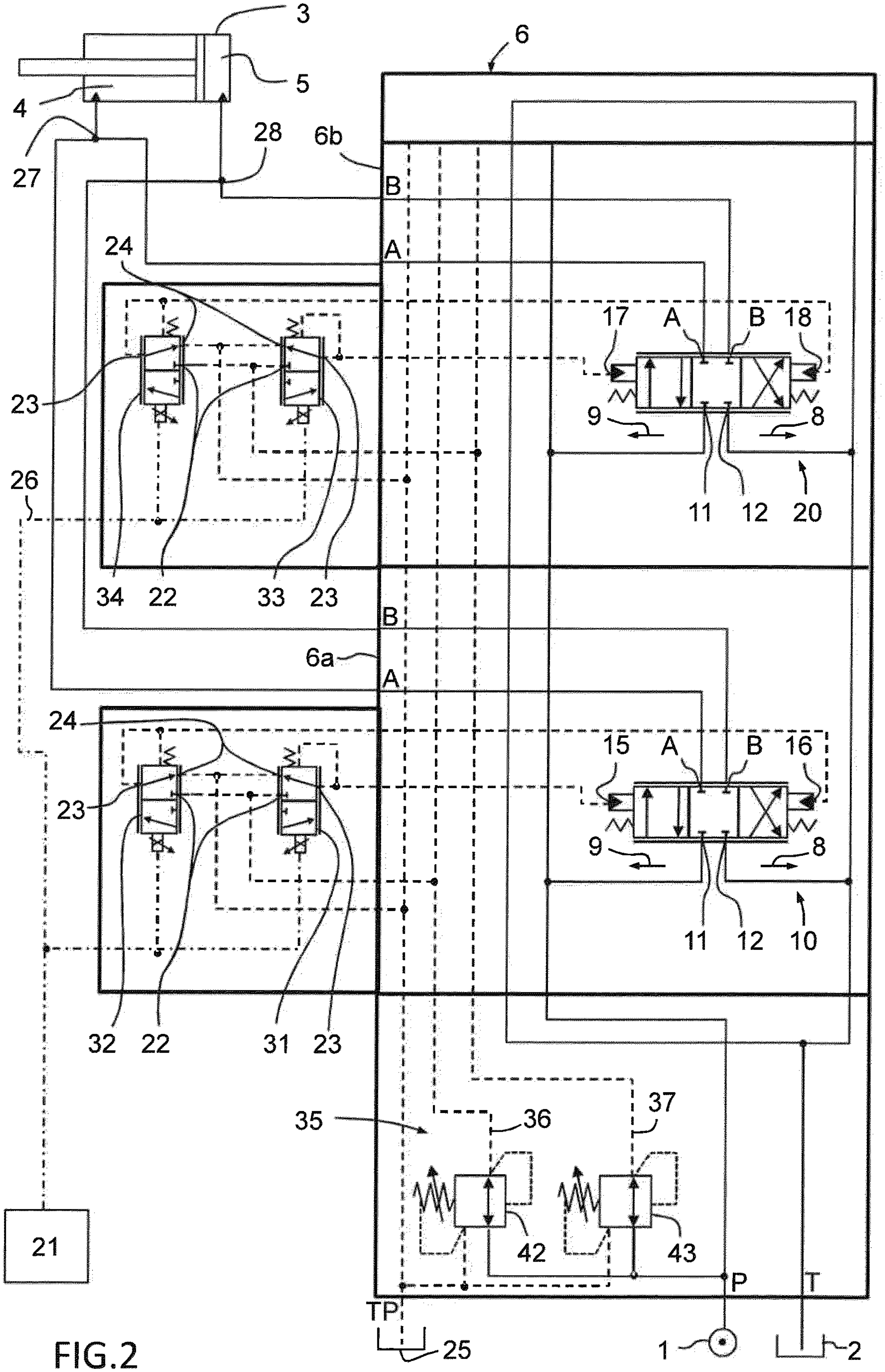

A further example embodiment of the redundant hydraulic system is described below with reference to FIG. 2. This embodiment of the system differs from the system described with reference to FIG. 1 in terms of the design of the redundant pilot pressure fluid supply system 35. Specifically, an inlet port 22 of each of the first and second fail-safe solenoid-controlled pilot valves 31, 32 is connected to the first pilot pressure fluid supply line 36, and an inlet port 22 of each of the third and fourth fail-safe solenoid-controlled pilot valves 33, 34 is connected to the second pilot pressure fluid supply line 37.

Also this design of the redundant pilot pressure fluid supply system 35 provides redundant pilot pressure supply to the first to fourth pilot valves 31-34, because malfunctioning of for example the first pressure reducing valve 42 still enable pilot pressure to the third and fourth pilot valves 33, 34, thereby still enabling fully operational second directional control valve 20 and/or second pilot-operated directional control valve work section 6*b*.

Figure 3:
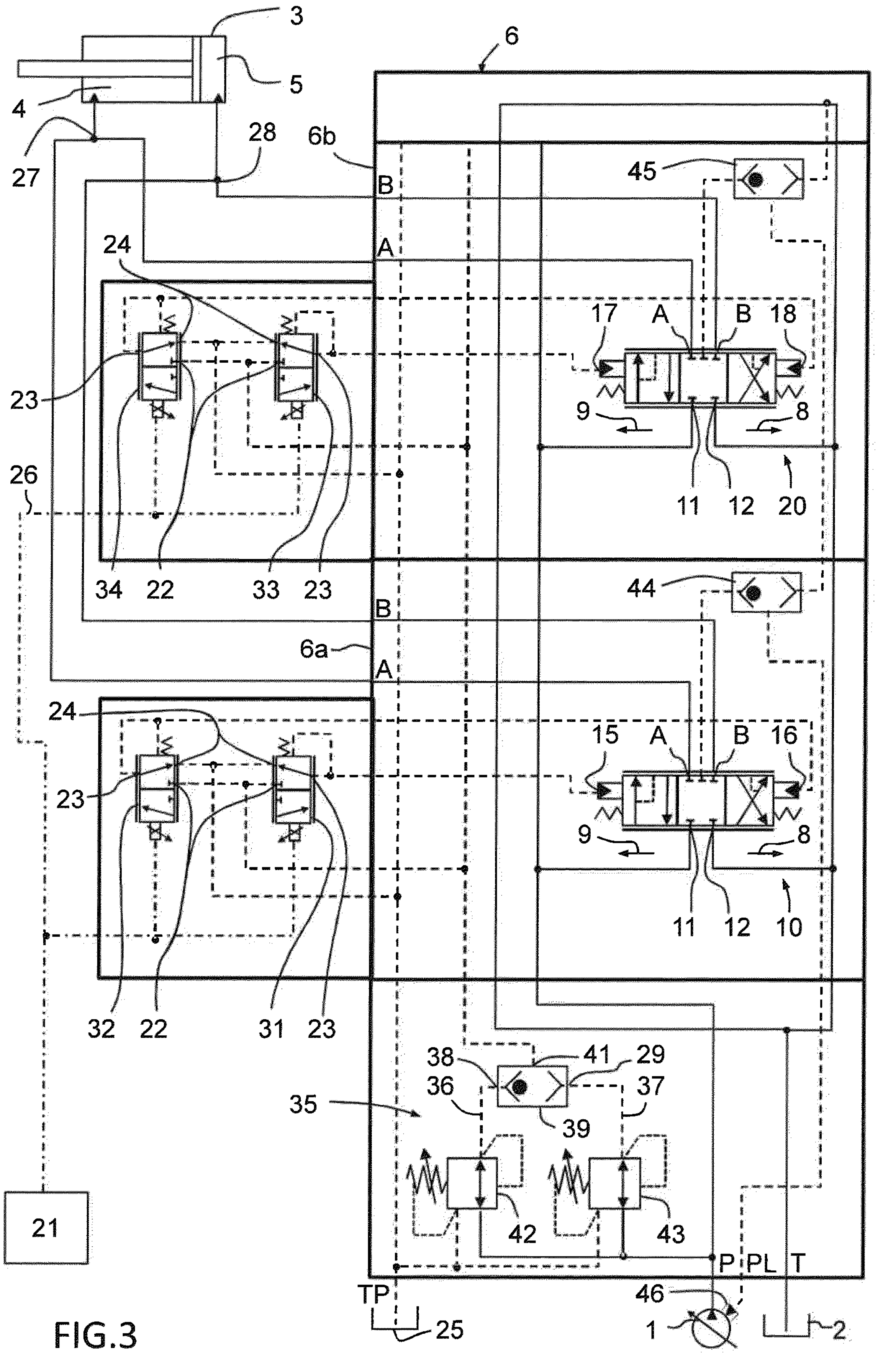

A further example embodiment of the redundant hydraulic system is described below with reference to FIG. 3, which differs from the embodiment of FIG. 1 in that a redundant hydraulic system further includes a load-sensing circuit.

In this example embodiment, the load sensing circuit comprises a variable displacement pump 1 controlled by a load sensing controller 46, wherein the first and second directional control valves 10, 20 are provided with integral load-signal gallery. The load-signal gallery connects the first and second actuator ports A, B of the first and second directional control valves 10, 20 with the load sensing controller through first and second shuttle valves 44, 45 connected in series. Since both the first and second directional control valve 10, 20 are connected to the same hydraulic actuator, the load-sensing circuit here enables This ensures fully operational load-sensing and continuous adjustment of the variable displacement pump 1 also when one of the directional control valves 10, 20 has failed or stopped operation for any reason.

For example, even if the first pilot valve becomes stuck in the open position, thereby preventing the flow control valve of the first directional control valve to become displaced in the first direction 8, the load-sensing circuit detect the load of the second directional control valve 20 and adjusts the variable displacement pump 1 accordingly.

Figure 4:
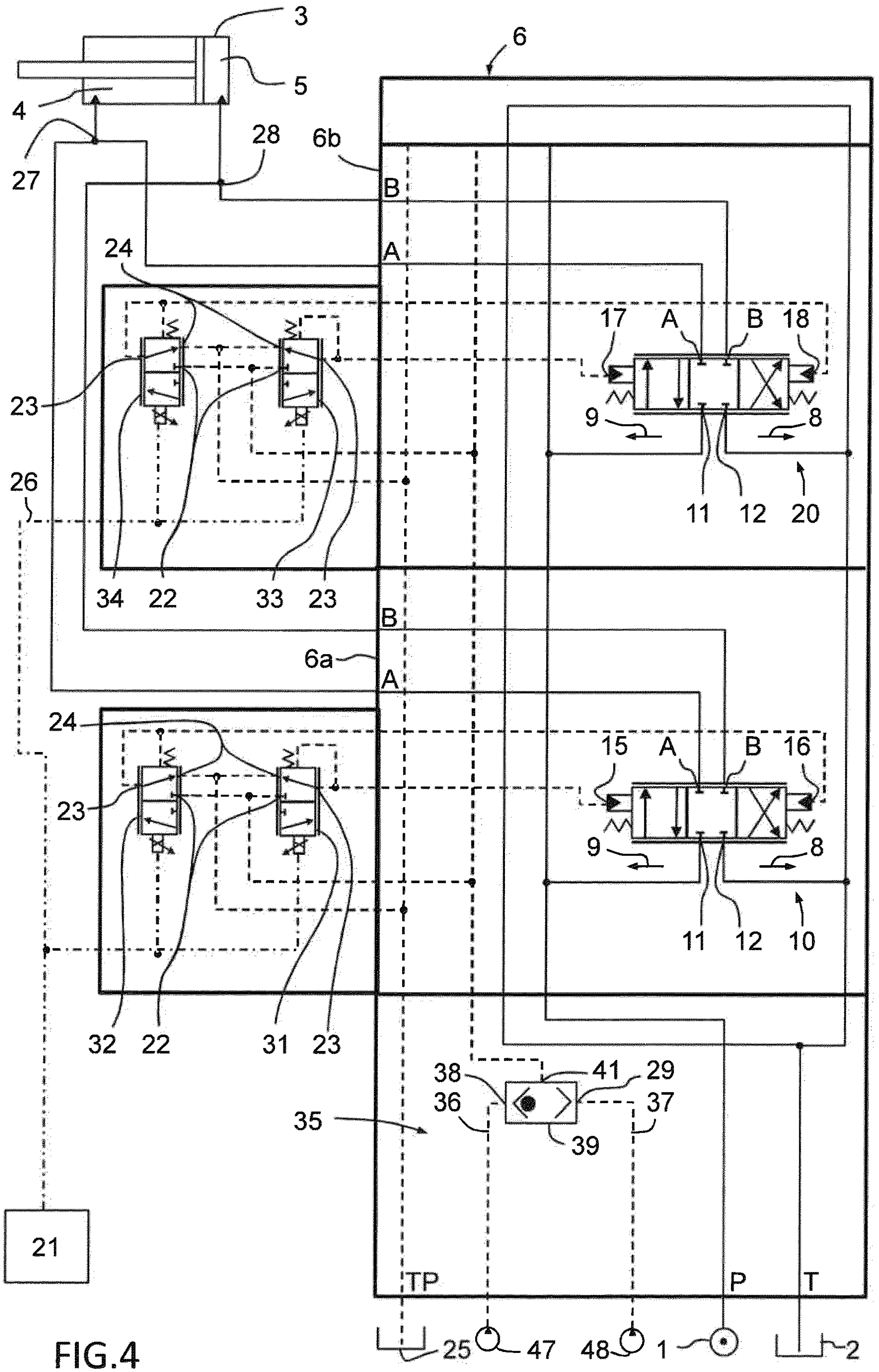

A further example embodiment of the redundant hydraulic system is described below with reference to FIG. 4, which differs from the embodiment of FIG. 1 in that the redundant pilot pressure fluid supply system 35 includes first and second dedicated pilot fluid pumps 47, 48 instead of first and second pressure reducing valves 42, 43. In other words, a first pilot fluid pump 47 supplies pilot fluid to the first pilot pressure fluid supply line 36 and a second pilot fluid pump 48 supplies pilot fluid to the second pilot pressure fluid supply line 37.

Figure 5:
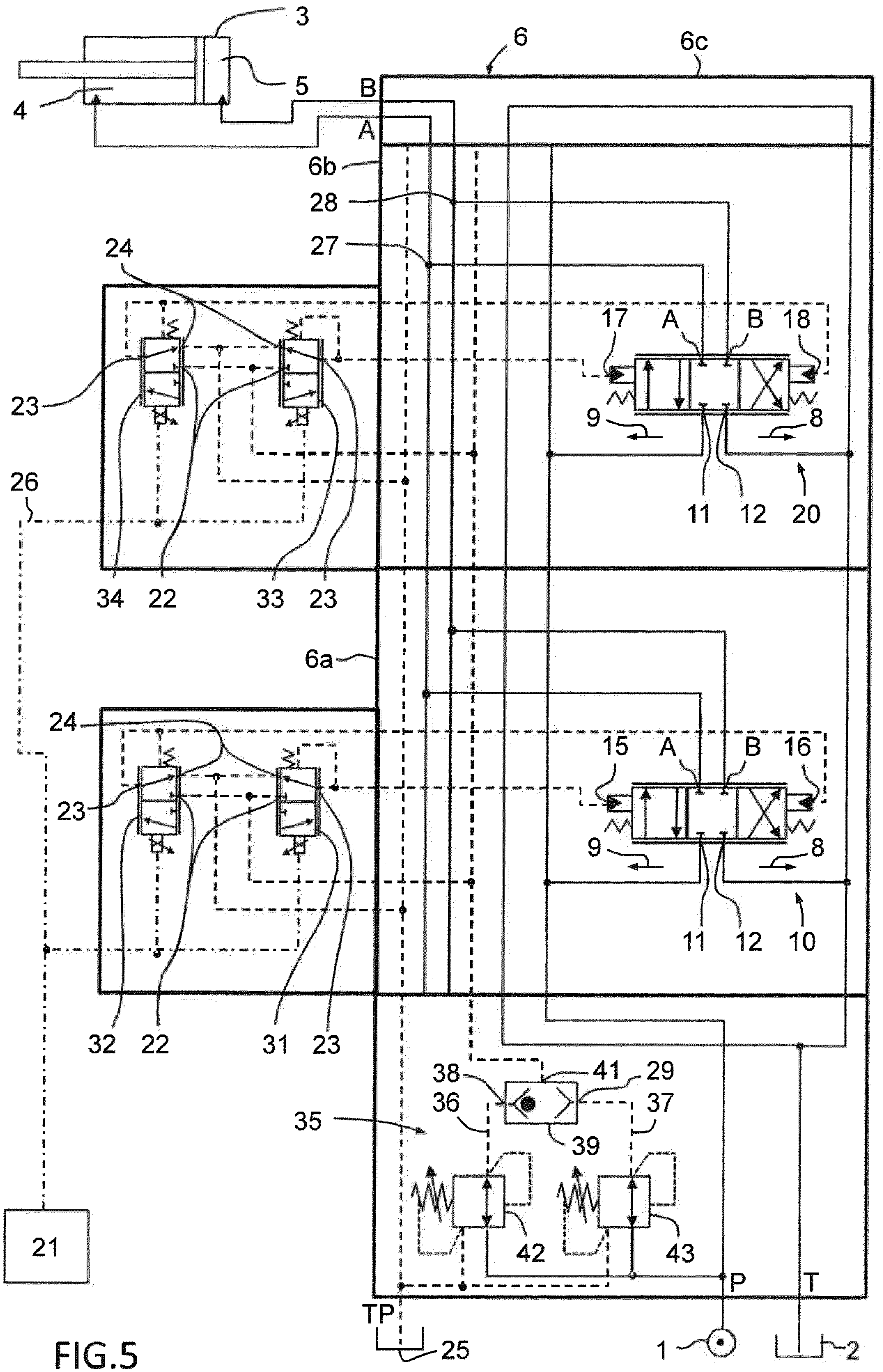

A further example embodiment of the redundant hydraulic system is described below with reference to FIG. 5, which differs from the embodiment of FIG. 1 in that the hydraulic high-pressure lines connecting the first and second actuator ports A, B of the first and second directional control valves 10, 20 are mutually connected and routed internally within the valve assembly 6, and thus merely eliminating the need for external mutual connection of said first and second actuator ports A, B of the various directional control valves 10, 20. This thus has the benefit of enabling simplified installation, reduced risk for leakage, and reduced risk for damage and wear on the external high-pressure connections and hoses.

In other words, the first common connection point 27 connecting the first actuator port A of the first pilot-operated directional control valve 10 with the first actuator port A of the second pilot-operated directional control valve 20 is located within the valve assembly 6. Similarly, the second common connection point 28 connecting the second actuator port B of the first pilot-operated directional control valve 10 with the second actuator port B of the second pilot-operated directional control valve 20 is also located within the valve assembly 6.

Moreover, when the valve assembly is a sectional valve assembly, having identical first and second pilot-operated directional control valve work sections 6*a*, 6*b* without external ports for the first and second actuator ports A, B, said external ports for the first and second actuator ports A, B are preferably, but not necessarily, located in an input section or end section of a stacked sectional valve assembly. Such a design is schematically illustrated in FIG. 5, wherein first and second actuator ports A, B common for both the first and second directional control valves 10, 20 are arranged in an end section 6*c* of the sectional valve assembly 6.

Figure 6A:
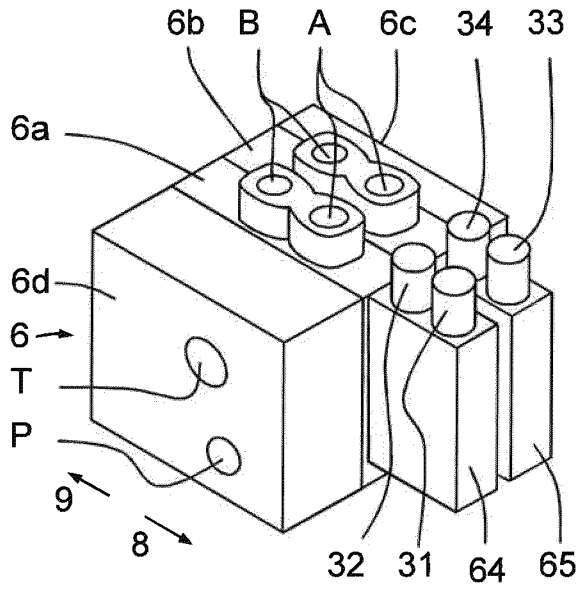
FIG. 6A-D show various designs of the valve assembly.

As mentioned above, the redundant valve assembly is preferably a sectional or monoblock valve assembly. A sectional valve assembly corresponds to a valve assembly that is composed of a plurality of stacked individual work sections that may various functionality, as schematically illustrated in FIG. 6A. The work sections 6*a*, 6*b* may be designed to be sandwiched between a dedicated inlet section 6*d* and a dedicated end section 6*c*, which sections may be have inlet and/or outlet ports that are common for all work sections located there between. In some example embodiments, the inlet and/or end sections also include a valve.

The sectional design of the valve assembly enables a highly modular design of the redundant valve assembly according to the disclosure because the number of work sections, i.e. the number of directional control valves, may be easily selected and stacked together for each specific application.

Figure 7:
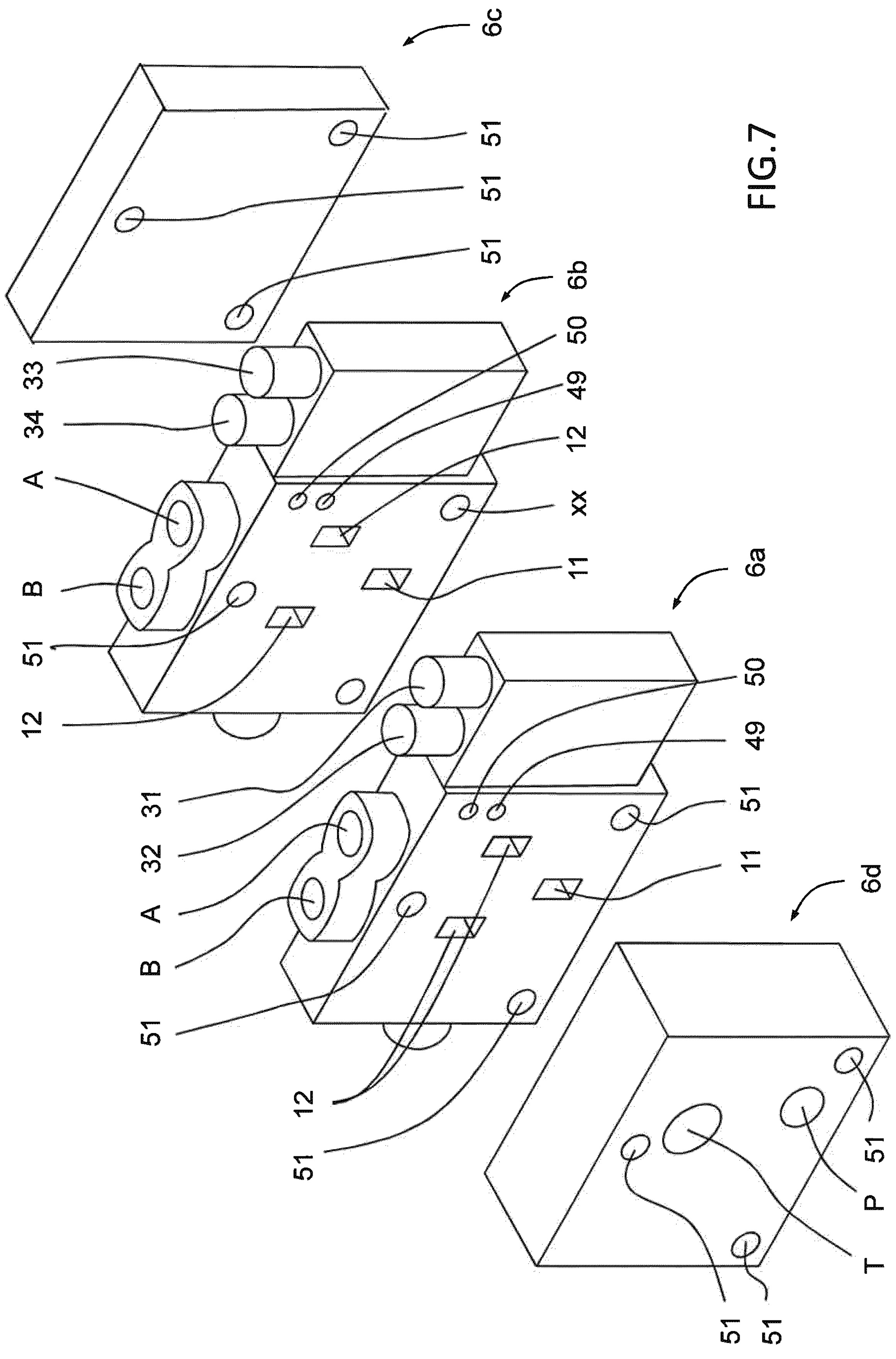
FIG. 7 shows a sectional valve assembly.

FIG. 7 shows an example embodiment of an exploded view of a sectional valve assembly, wherein the intermediate work sections 6*a*, 6*b* have identical design, each including an inlet port 11 configured for receiving high-pressure hydraulic fluid from the hydraulic fluid pressure source 1 via a pump port P in the inlet section 6*d*, an outlet port 12 configured for draining hydraulic fluid to the hydraulic fluid reservoir 2 via a tank port T in the inlet section 6*d*, a pilot fluid supply port 49 configured for being fluidly connected to for example an outlet port 41 of the shuttle valve 39 of the redundant pilot pressure fluid supply system 35, a pilot fluid discharge port 50 configured for being connected to the pilot tank port TP in in the inlet section 6*d*, a first actuator port A, a second actuator port B and a flow control spool (not showed).

The intermediate work sections *6a*, *6b*, as well as the inlet section *6d* and end section *6c* additionally includes through holes 51 configured for receiving a threaded member, such as screw or tie bar or the like, for enabling stacking and clamping together of the sections *6a-d*.

Figure 8:
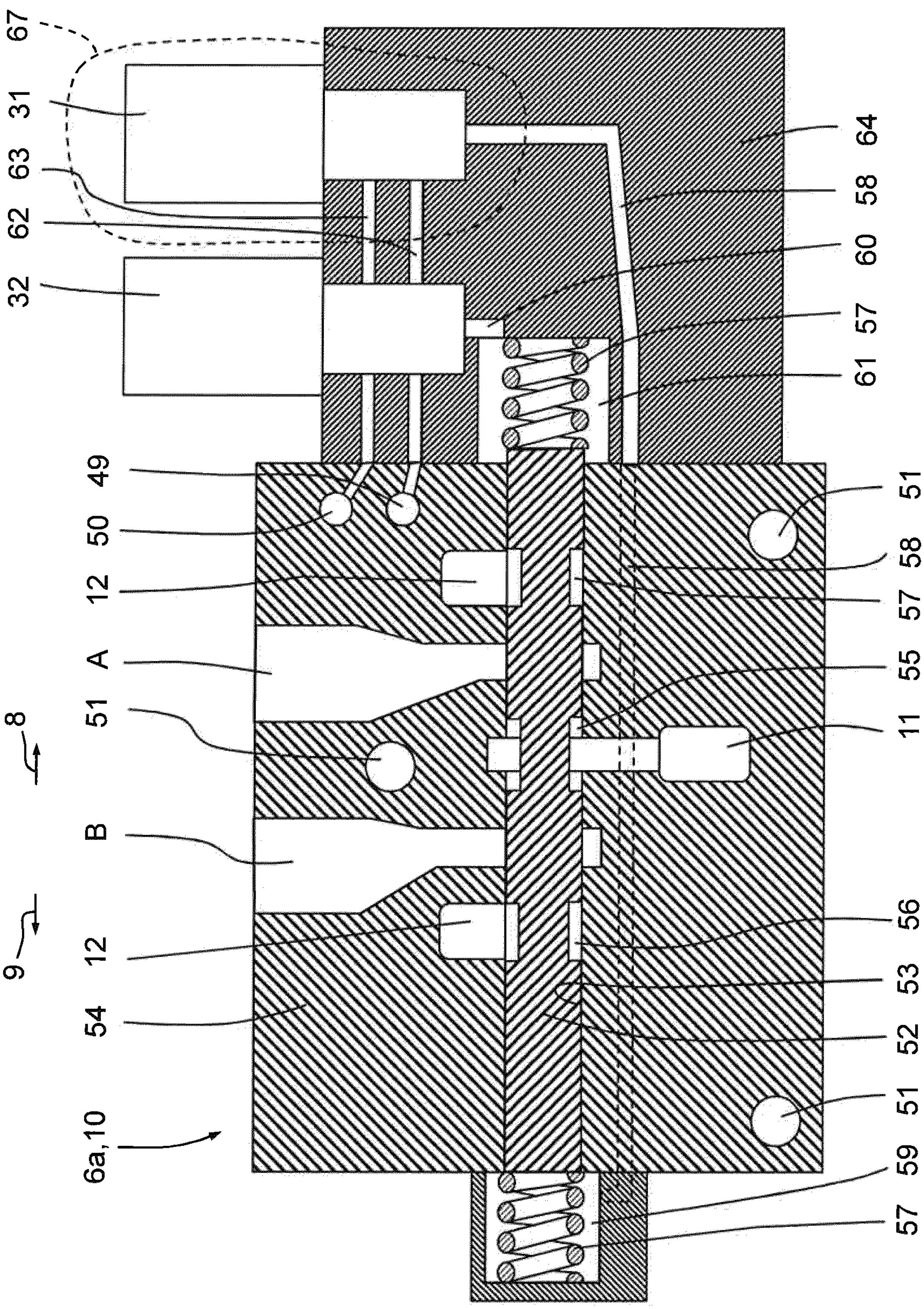
FIG. 8 shows a cross-section of an example embodiment of a work section.

FIG. 8 schematically shows cross-sectional view of an example embodiment of a work section having a directional control valve, such as the first pilot-operated directional control valve work section 10, having an axially displaceable flow control spool 52 located in a bore 53 of a housing 54 of the work section *6a*.

The work section *6a* further ha an inlet port 11 for receiving high-pressure hydraulic fluid from the hydraulic fluid pressure source 1 and selectively supplying said high-pressure fluid to the first or second actuator ports A, B, and two outlet ports 12 for draining hydraulic fluid received from the first or second actuator ports A, B to the hydraulic fluid reservoir 2.

This flow control is accomplished by either displacing the flow control spool in the first direction 8, such that a central recess 55 of the flow control spool 52 creates a flow passage between the inlet port 11 and the first actuator port A, while a first lateral recess 56 of the flow control spool 52 creates a flow passage between the second actuator port B and the outlet port 12, or displacing the flow control spool in the second direction 8, such that a central recess 55 of the flow control spool 52 creates a flow passage between the inlet port 11 and the second actuator port B, while a second lateral recess 57 of the flow control spool 52 creates a flow passage between the first actuator port A and the outlet port 12.

The flow control spool 52 may be spring-biased to a neutral position by means of two axial springs 57 or the like exerting an axial displacement force in opposite directions on the flow control spool 52. Furthermore, pilot fluid supplied by the first pilot valve 31 is routed via a first internal channel 58 to a first pressure chamber 59 that is partly defined by an first axial surface of the flow control spool 52, such that said pilot fluid will exert an axial displacement force in the flow control spool 52 for moving the flow control spool 52 in the first direction 8. Similarly, pilot fluid supplied by the second pilot valve 32 is routed via an internal channel 60 to a second pressure chamber 61 that is partly defined by a second axial surface of the flow control spool 52, such that said pilot fluid will exert an axial displacement force in the flow control spool 52 for moving the flow control spool 52 in the second direction 9.

The first and second pilot valves 31, 32 may be fluidly connected to the pilot fluid supply port 49 and the pilot fluid discharge port 50 via second and third internal channels 62, 63 of the work section *6a*, respectively.

Consequently, with reference to the example embodiments of FIGS. 1-5, *6a*, 7 and 8, the valve assembly 6 may a redundant sectional valve assembly, wherein the first pilot-operated directional control valve 10 is assembled in a first individual work section *6a*, wherein the second pilot-operated directional control valve 20 is assembled in a second individual work section *6b*, wherein each of the first and second work sections *6a*, *6b* include said inlet port 11 fluidly connected for receiving high-pressure hydraulic fluid from the hydraulic fluid pressure source 1, said outlet port fluidly 12 connected for draining hydraulic fluid to the hydraulic fluid reservoir 2, said first actuator port A fluidly coupled with the first chamber of the hydraulically driven actuator, said second actuator port B fluidly coupled with the second chamber of the hydraulically driven actuator, and said pilot operated flow control spool 52 arranged in a spool bore 53, and wherein said first and second individual work sections *6a*, *6b* are stacked and clamped together to provide the assembled sectional valve assembly 6.

Furthermore, the sectional valve assembly 6 may in some example embodiments further comprise a inlet section *6d* and an end section *6c*, wherein the inlet section *6d*, the first individual work section *6a*, the second individual work section *6b* and the end section *6c* are stacked and clamped together to provide the assembled sectional valve assembly 6, and wherein the inlet section *6d* and/or end section *6c* includes an pump port P and a tank port T.

In some example embodiments, the first and second pressure reducing valves 42, 43 and the shuttle valve 39 are located in the inlet section *6d*.

Moreover, an outlet of each of the first and second pressure reducing valves 42, 43 is fluidly connected to an inlet port 22 of the first and second pilot valves of the first work section *6a* and to an inlet port 22 of the third and fourth pilot valves of the second work section *6b*.

Furthermore, in some example embodiments, the first and second fail-safe solenoid-controlled pilot valves 31, 32 are assembled in a first common housing 64, and the third and fourth fail-safe solenoid-controlled pilot valves 33, 34 are assembled in a second common housing 65.

Said first common housing 64 may be mounted on the first directional control valve work section *6a*, and second common housing 65 may be mounted on the second directional control valve work section *6b*. These common housings are for example fastened to the associated work section by screws.

Figure 6B:
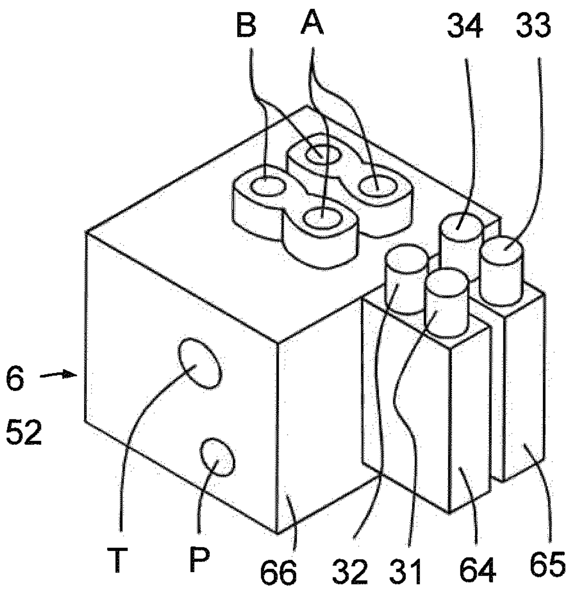
Figure 6C:
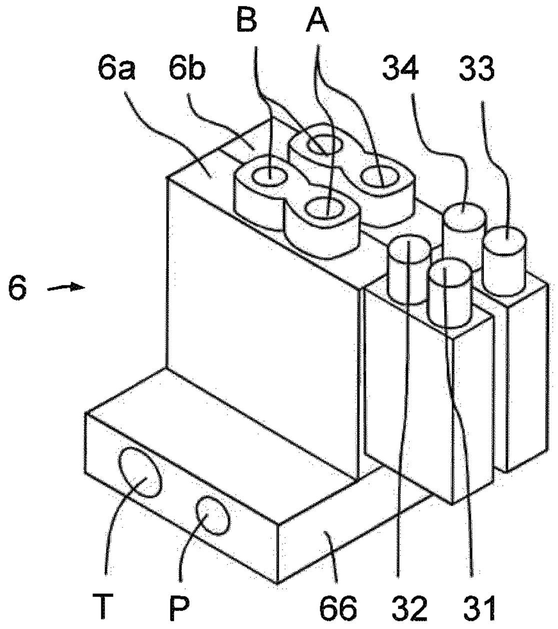
Figure 6D:
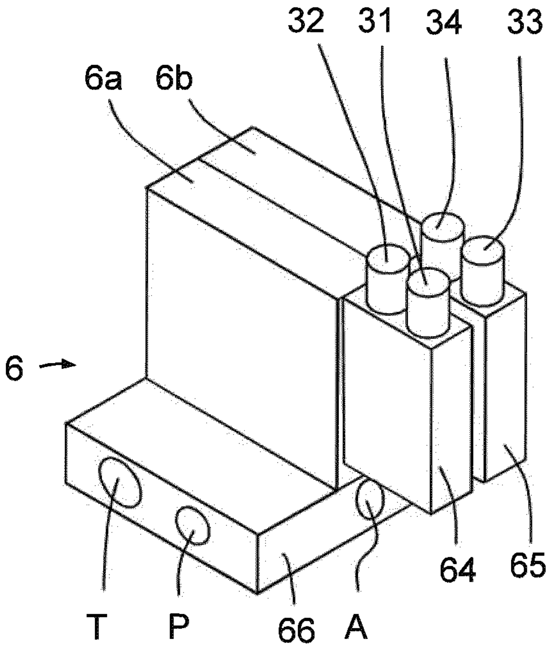

With reference to FIGS. 6B-6D, the valve assembly may alternatively be designed as monoblock valve assembly, wherein FIGS. 6B-D show some alternative monoblock designs. Monoblock design is also modular and flexible, but since the size of the monoblock is fixed, a monoblock valve assembly is generally not as flexible and adaptable as a sectional valve assembly but may have other benefits in terms of robustness and leakproofness.

One example embodiment of a monoblock design is illustrated in FIG. *6b*, the first and second directional control valves 10, 20, the common pump inlet port P, common tank discharge port T, etc. may all be provided in one single-piece block structure 66. Alternatively, as illustrated in FIG. *6c*, the common pump inlet port P, common tank discharge port T, etc. may all be provided in one single-piece block structure 66, wherein the first and second directional control valves 10, 20 including the first and second actuator ports A, B are here individual parts that are attached to the monoblock. Still more alternatively, as illustrated in FIG. *6d*, the common pump inlet port P, common tank discharge port T, and the first and second actuator ports A, B are located in one single-piece block structure 66, wherein the first and second directional control valves 10, 20 are here individual parts that are attached to the monoblock 66.

Consequently, the redundant valve assembly may in in some example embodiments be a redundant monoblock valve assembly having a one-piece block 66 with integrally formed pump port P and tank port T, and with the first and second pilot-operated directional control valves 10, 20 formed either integrally in the block 66 or clamped to a surface of the block 66.

An example embodiment of the first fail-safe solenoid-controlled pilot valve is described below with reference to FIGS. 9A-9C, which shows a cross-section of the first pilot valve 31 in the region 67 marked with dashed-line in FIG. 8. All of the first to fourth pilot valves may have identical design. The first pilot valve 31 may be proportional solenoid operated control valve 31, wherein a solenoid of the pilot valve 31 controls the motion and position the associated pilot spool 68.

Specifically, the pilot spool 68 is controlled by a solenoid that has a electromagnetically inductive coil 69 wound around for example a movable magnetic member 70 referred to as the core or plunger, which is abutting a first end of the pilot spool 68 for transferring a force to the pilot spool 68 and thus to move said pilot spool 68 forwards 72 against a return force provided by a return spring 71 when the coil 69 is energized.

The pilot valve 31 has a stationary housing 73 with an axially extending internal bore 74, in which the pilot spool 68 may slide along an axial direction. The housing has a first flow path 75 between the inlet port 22 and the internal bore 74, a second flow path 76 between the discharge port 24 and the internal bore 74, and a third flow path 77 between the outlet port 22 and the internal bore 74.

Moreover, the inlet port 22 is in fluid communication with the pilot fluid supply port 49 via the second internal channel 62, the discharge port 24 is in fluid communication with the pilot fluid discharge port 50 via the third internal channel 63, and the outlet port 23 is in fluid communication with the first pressure chamber 59 via the first internal channel 58.

Figure 9B:
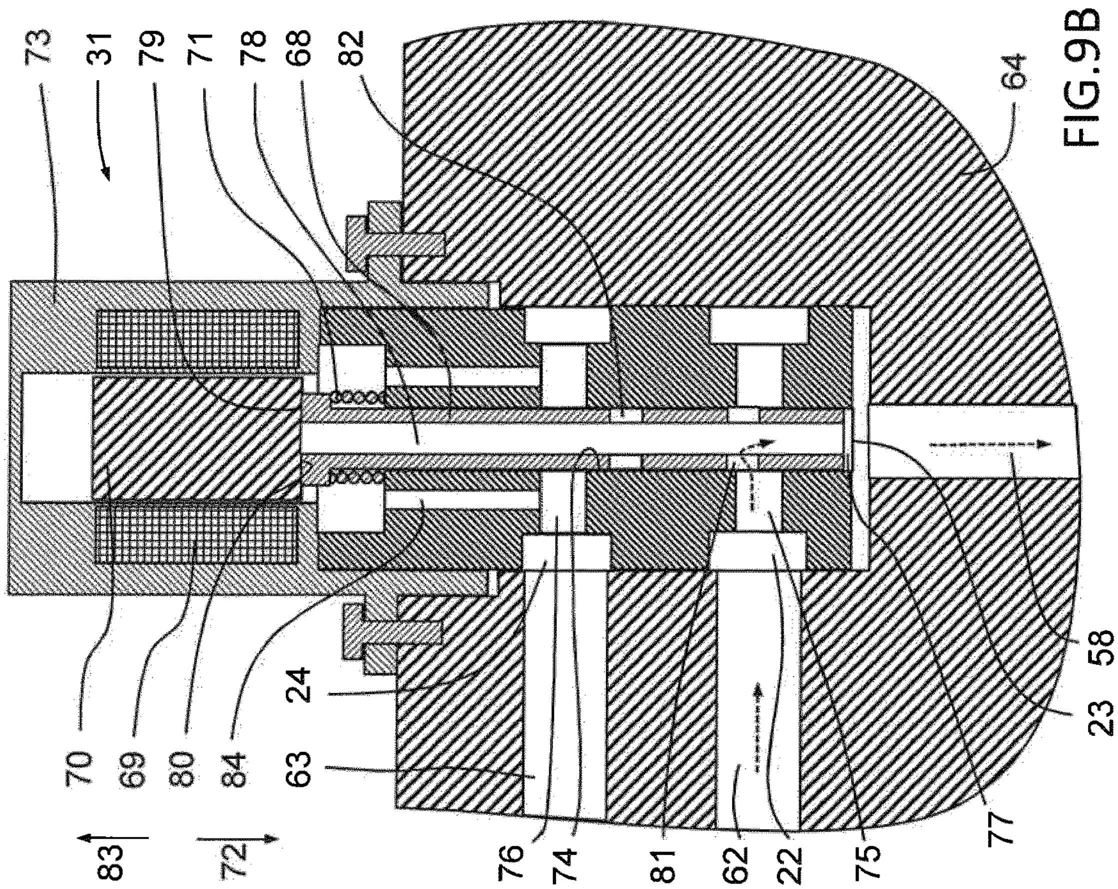
FIG. 9A-C show the functionality of an example embodiment a fail-safe pilot valve.
Figure 9A:
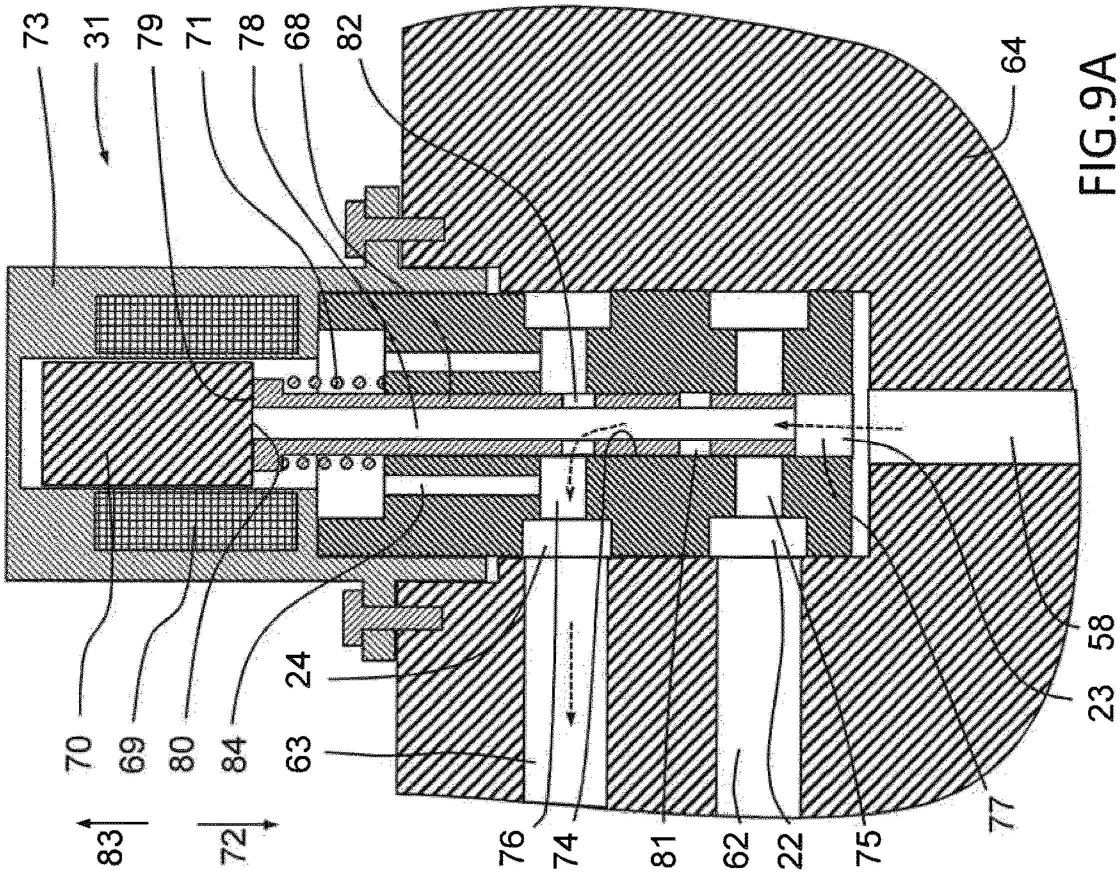
Figure 9C:
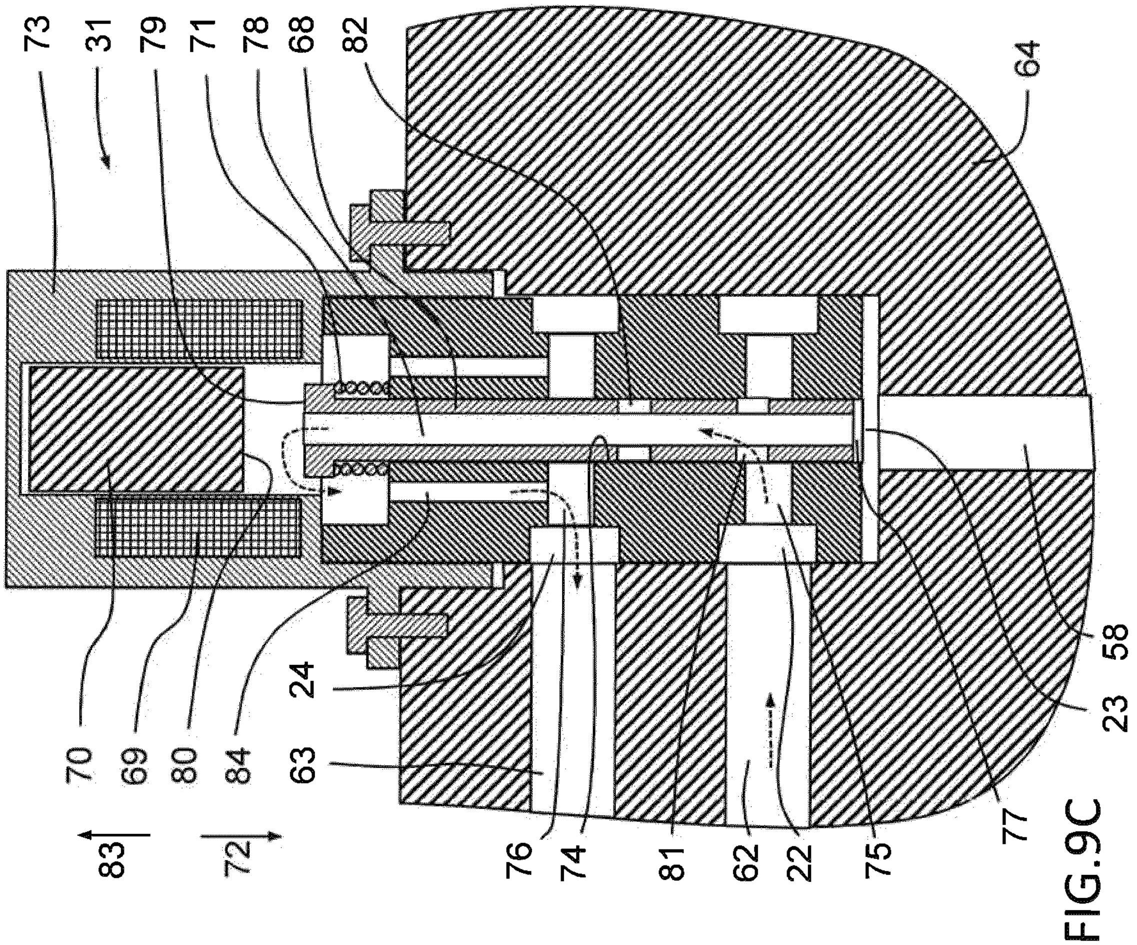

Moreover, in the example embodiment of FIGS. 9A-C, the pilot spool 38 is hollow and has an internal axial flow passage 78 extending in the axial direction. The axial flow passage 78 has an opening at the first end of the pilot spool, which opening is normally closed by the plunger 70, because the pilot spool 68 is spring-loaded rearwards 83 towards the plunger by means of the axial spring 71, and a contact surface between an axial abutment surface 79 of the pilot spool 68 and a corresponding opposite abutment surface 80 of the plunger 70 seals the first end. Furthermore, the axial flow passage 78 is open at the second end of the pilot spool 68.

In the example embodiment of FIGS. 9A-C, the pilot spool 38 further has a first lateral flow passage 81 at a first axial position and a second lateral flow passage 82 at a second axial position.

FIG. 9A-C schematically illustrates three different states of the first pilot valve 31, wherein FIG. 9A represents a deactivated/de-energized state, in which the pilot spool 68 in the neutral position, FIG. 9B represents an activated/energized state, in which the pilot spool 68 is in an actuated position, and FIG. 9C represents a failure state, in which the pilot spool 68 is stuck in the open position, for example due to interference between the pilot spool 68 and bore 74, caused for example by wedged solid contaminants.

In the deactivated/de-energized state of FIG. 9A, pilot fluid may flow from the first pressure chamber 59 to the outlet port 23 via the first internal channel 58, and then through the internal axial flow passage 78 of the pilot spool 68 to the discharge port 24 via the second lateral flow passage 82 of the pilot valve and the second flow path 76 of the pilot valve housing. Furthermore, the pilot spool 68 blocks the first flow path 75 of the housing, thereby preventing any pilot fluid from the redundant pilot pressure fluid supply system 35 reaching the outlet port 23. Hence, in the deactivated/de-energized state of the pilot valve, pilot fluid may be drained from the directional control valve 10 to the pilot tank.

In the activated/energized state of FIG. 9B, pilot fluid from redundant pilot pressure fluid supply system 35 may flow from the inlet port 22 to the outlet port 23 via the first flow path 75 of the housing and the first lateral flow passage 81 of the pilot spool 68, and then further to first pressure chamber 59 of the directional control valve 10. Furthermore, the pilot spool 68 blocks the second flow path 76 of the housing, thereby preventing any pilot fluid from the redundant pilot pressure fluid supply system 35 from escaping out from the pilot valve 31 via the discharge port 24. Hence, in the activated/energized state of the pilot valve, pressurized pilot fluid is routed to the directional control valve 10 for displacing the flow control spool 52.

In the failure state of FIG. 9C, which may occur when shifting the pilot valve from the activated/energized state to the deactivated/de-energized state and the pilot spool 68 becomes stuck in the open position due to for example solid contaminants, the plunger 70 will move rearwards 83 in FIG. 9C and thus separate from the pilot spool 68, thereby opening a drain passage extending between the axial flow passage 78 of the pilot spool 68 and the discharge port 24. Specifically, separation of the plunger 70 from the pilot spool 68 enables pilot fluid to flow out from the axial flow passage 78 at the first end of the pilot spool 68, and then flowing through a passage 84 to the discharge port 24. Hence, the fail-safe functionality of the pilot valve 31 provides that pressurized pilot fluid from the redundant pilot pressure fluid supply system 35 may bypass the outlet port 23 and flow directly to the discharge port 24 and back to the tank in case of stuck pilot spool 68 in actuated position, thereby effectively strongly reducing the pilot pressure at the outlet port 23 and enabling the flow control spool 52 to remain in the neutral state even of the pilot spool is stuck in the open state.

Consequently, each of the first to fourth fail-safe solenoid-controlled pilot valves 31-34 has a normally closed internal drain passage that is configured to automatically and individually and independent from other of first to fourth pilot valves 31-34 open for enabling automatic drainage of pilot pressure fluid supplied from the pilot pressure fluid supply system 35 to the discharge port of the associated fail-safe solenoid-controlled pilot valve 31-34, thereby depressurizing the pilot pressure at the outlet port of the associated pilot valve in the event a pilot spool of the associated fail-safe solenoid-controlled pilot valve is stuck, jammed, wedged or blocked in the actuated state.

Figure 10A:
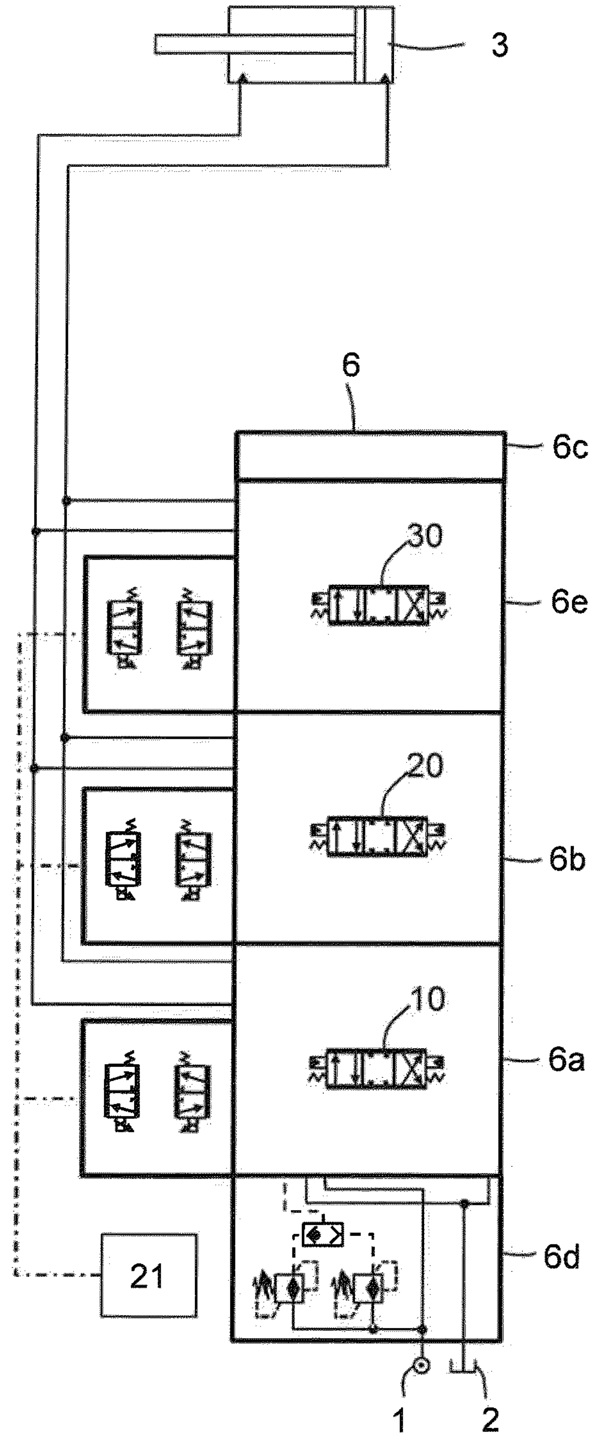
FIG. 10A-B show two further example embodiments of the present disclosure.

Merely for illustrating the scalable and modular character of the present redundant hydraulic system, FIG. 10A schematically shows a hydraulic actuator 3 that is operated by three parallel connected directional control valves 10, 20, 30, each of which may be implemented in form of individual work sections 6*a*, 6*b*, 6*e* that are stacked together in a single stack with an inlet section 6*d* and end section 6*c*. In such a scenario, the flow capacity of each directional control valves 10, 20, 30 may for example be at least 50% of the required flow capacity of the hydraulic actuator, such that failure of one of the directional control valve 10, 20, 30 does not prevent further operation of the redundant hydraulic system.

Figure 10B:
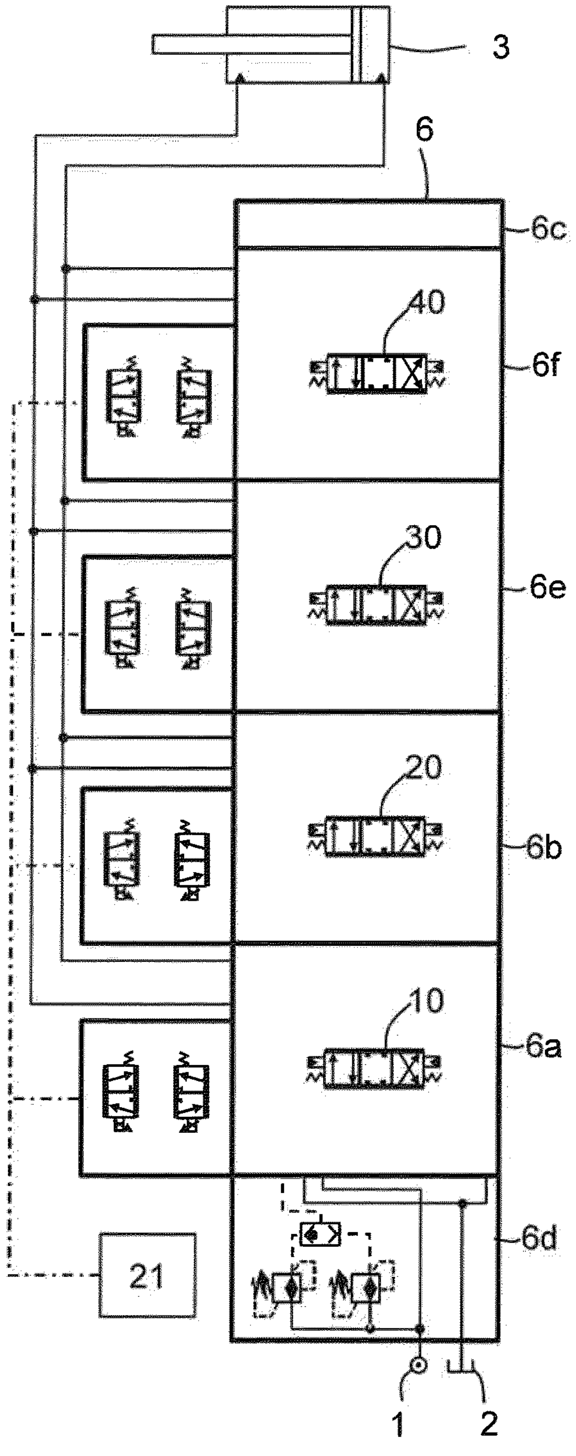

Similarly, FIG. 10B schematically shows a hydraulic actuator 3 that is operated by four parallel connected directional control valves 10, 20, 30, 40, each of which may be implemented in form of individual work sections 6*a*, 6*b*, 6*e*, 6*f* that are stacked together in a single stack with an inlet section 6*d* and end section 6*c*. In such a scenario, the flow capacity of each directional control valves 10, 20, 30 may for example be at least 34% of the required flow capacity of the hydraulic actuator, such that failure of one of the directional control valve 10, 20, 30, 40 does not prevent further operation of the redundant hydraulic system.

Figure 11:
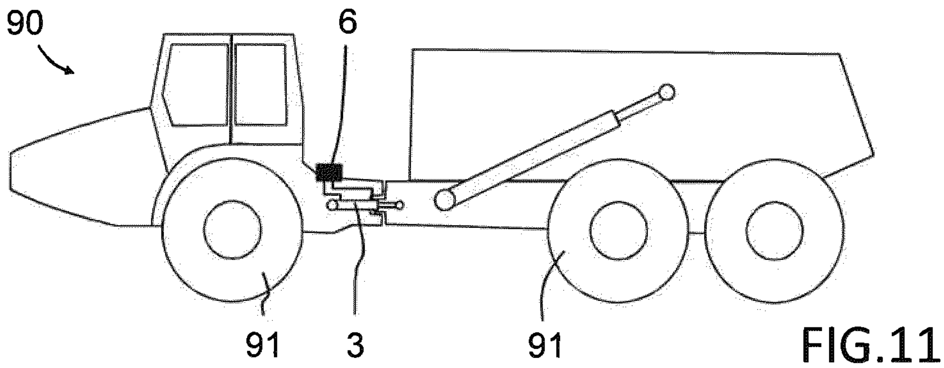
FIG. 11 shows a vehicle having a redundant hydraulic steering system.

With reference to FIG. 11, the disclosure also relates to vehicle 90 comprising wheels 91 and/or crawlers for facilitating movement of the vehicle and an solenoid-controlled control system as described above, wherein the at least one hydraulic actuator 3 is configured to be used for steering the vehicle 90. Specifically, in the example embodiment of FIG. 11, the redundant hydraulic system is arranged for controlling articulation angle of an articulated vehicle 90.

Figure 12:
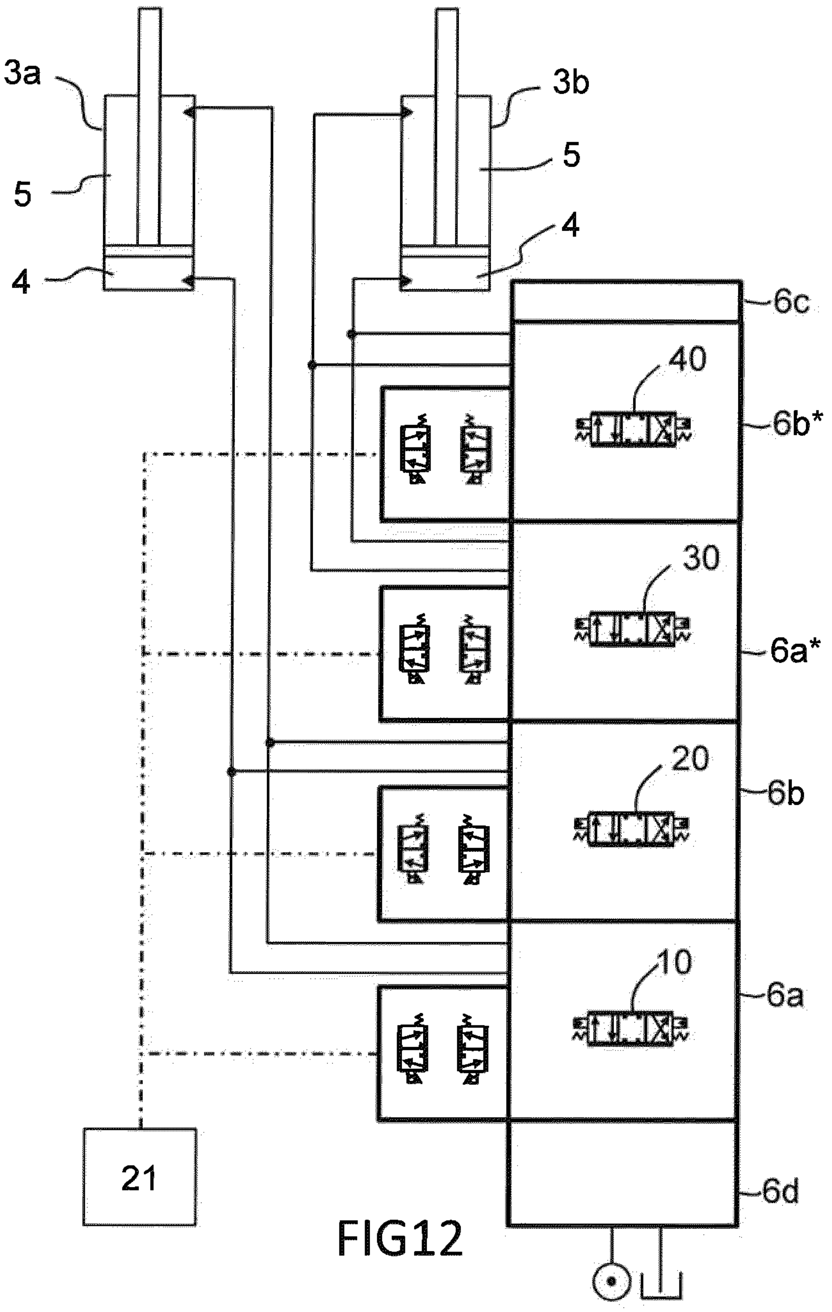
FIG. 12 shows an example embodiment of the a hydraulic system for steering of the vehicle.

Redundant hydraulic systems arranged for controlling articulation angle of an articulated vehicle 90 typically includes two hydraulic actuators that cooperate for controlling the steering angle. FIG. 12 schematically shows a redundant hydraulic system according to the disclosure for such an implementation, i.e. for controlling two actuators.

More in detail, with reference to FIG. 12, a redundant hydraulic system comprises a first and second directional control valves 10, 20 connected in parallel for redundant operation of a first hydraulic actuator, and third and fourth directional control valves 30, 40 connected in parallel for redundant operation of a second hydraulic actuator 3*b*. In other words, a first actuator port A of both the first and second directional control valves 10, 20 are fluidly coupled with the first chamber 4 of the first hydraulic actuator, and a second actuator port B of both the first and second directional control valves 10, 20 are fluidly coupled with the second chamber 5 of the first hydraulic actuator 3*a*. In addition, a first actuator port A of both the third and fourth directional control valves 30, 40 are fluidly coupled with the first chamber 4 of the second hydraulic actuator, and a second actuator port B of both the third and fourth directional control valves 30, 40 are fluidly coupled with the second chamber 5 of the second hydraulic actuator 3*b*. Thereby, redundant operation of both the first and second hydraulic actuators 3*a*, 3*b* is provided. Moreover, by providing the first to fourth directional control valves as a sectional valve assembly, a compact, scalable and flexible design is accomplished.

Figure 13:
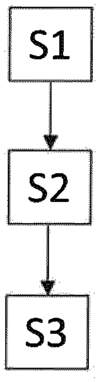
FIG. 13 shows the basic steps of a method according to the disclosure.

The disclosure also relates to a method for method for operating an hydraulically driven actuator of a redundant hydraulic system. The basic steps of the method are described below with reference to FIG. 13. The method comprises a first step S10 of providing a hydraulic system that comprises a hydraulic actuator; a first pilot-operated directional control valve connected to the hydraulic actuator and a second pilot-operated directional control valve also connected to the hydraulic actuator; first and second fail-safe solenoid-controlled pilot valves operatively connected to the first pilot-operated directional control valve, and third and fourth fail-safe solenoid-controlled pilot valves operatively connected to the second pilot-operated directional control valve.

The method further comprises a second step S20 of energizing a solenoid of the first fail-safe solenoid-controlled pilot valve for displacing an associated pilot spool forwards, such that a flow passage opens that supplies pilot pressure fluid from a redundant pilot pressure fluid supply system to a first longitudinal end of a flow control spool of the first directional control valve, and such that high-pressure hydraulic fluid from an external hydraulic fluid pressure source is routed to a first chamber of the hydraulically driven actuator via the first directional control valve, and substantially simultaneously energizing a solenoid of the third fail-safe solenoid-controlled pilot valve for displacing an associated pilot spool forwards, such that a flow passage opens that supplies pilot pressure fluid from the redundant pilot pressure fluid supply system to a first longitudinal end of a flow control spool of the second directional control valve, and such that high-pressure hydraulic fluid from the external hydraulic fluid pressure source is routed to said first chamber of the hydraulically driven actuator via the second directional control valve.

Finally, the method comprises a third step S30 of stopping energizing the solenoid of the first fail-safe solenoid-controlled pilot valve, and substantially simultaneously stopping energizing the solenoid of the third fail-safe solenoid-controlled pilot valve, wherein subsequent rearwards motion of a plunger of the solenoid of the first fail-safe solenoid-controlled pilot valve causes opening of a drain passage in the first fail-safe solenoid-controlled pilot valve for enabling automatic drainage of pilot pressure fluid supplied from the pilot pressure fluid supply system in the event the associated pilot spool is stuck in an actuated state, and wherein subsequent rearwards motion of a plunger of the solenoid of the third fail-safe solenoid-controlled pilot valve causes opening of a drain passage in the third fail-safe solenoid-controlled pilot valve in the event the associated pilot spool is stuck in an actuated state.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

What is claimed is:

1. A redundant hydraulic system comprising:

a hydraulic fluid pressure source, a hydraulic fluid reservoir, a hydraulically driven actuator having a first chamber and a second chamber, a redundant sectional or monoblock valve assembly having a first pilot-operated directional control valve and a second pilot-operated directional control valve, each including: an inlet port fluidly connected for receiving high-pressure hydraulic fluid from the hydraulic fluid pressure source, an outlet port fluidly connected for draining hydraulic fluid to the hydraulic fluid reservoir, a first actuator port fluidly coupled with the first chamber of the hydraulically driven actuator, a second actuator port fluidly coupled with the second chamber of the hydraulically driven actuator, and a pilot operated flow control spool arranged in a spool bore, a first fail-safe solenoid-controlled pilot valve operably connected to the first directional control valve and configured for driving the flow control spool in a first direction, a second fail-safe solenoid-controlled pilot valve operably connected to the first directional control valve and configured for driving the flow control spool in a second direction, a third fail-safe solenoid-controlled pilot valve operably connected to the second directional control valve and configured for driving the flow control spool in the first direction, a fourth fail-safe solenoid-controlled pilot valve operably connected to the second directional control valve and configured for driving the flow control spool in the second direction, and a redundant pilot pressure fluid supply system having a first pilot pressure fluid supply line and a second pilot pressure fluid supply line configured for supplying pilot pressure fluid to the first to fourth fail-safe solenoid-controlled pilot valves, wherein each of the first to fourth fail-safe solenoid-controlled pilot valves has a normally closed internal drain passage that is configured to automatically open for enabling automatic drainage of the pilot pressure fluid supplied from the pilot pressure fluid supply system in the event a pilot spool of an associated fail-safe solenoid-controlled pilot valve is stuck in an actuated state, wherein the first pilot pressure fluid supply line is connected to a first input port of a shuttle valve and the second pilot pressure fluid supply line is connected to a second input port of the shuttle valve, and an inlet port of each of the first to fourth fail-safe solenoid-controlled pilot valves is connected to an outlet port of the shuttle valve, and wherein the redundant pilot pressure fluid supply system comprises a first pressure reducing valve configured for supplying the pilot pressure fluid to the first pilot pressure fluid supply line, and a second pressure reducing valve configured for supplying the pilot pressure fluid to the second pilot pressure fluid supply line.

2. The redundant hydraulic system according to claim 1, wherein the hydraulic system further comprises an electronic control system configured for operating the first and third pilot valves in parallel, and for operating the second and fourth pilot valves in parallel.

3. The redundant hydraulic system according to claim 2, wherein the electronic control system is configured for simultaneously supplying same control signals to both the first and third pilot valves, and for simultaneously supplying same control signals to both the second and fourth pilot valves.

4. The redundant hydraulic system according to claim 1, wherein the hydraulic system comprises an electronic control system that is configured for operating the first and second pilot-operated directional control valves in parallel.

5. The redundant hydraulic system according to claim 1, wherein an inlet port of each of the first and second pressure reducing valves is fluidly connected for receiving the high-pressure hydraulic fluid from the hydraulic fluid pressure source, or for receiving the pilot pressure fluid from a dedicated pilot pressure pump.

6. The redundant hydraulic system according to claim 1, wherein the hydraulic system is free from a valve and/or electronic control system configured for actively selectively setting one of the first and second pilot-operated directional control valves in an active state and/or setting another of the first and second pilot-operated directional control valves in a non-active state in response to a detected malfunction of a part of the hydraulic system.

7. The redundant hydraulic system according to claim 1, wherein a connection point connecting the first actuator port of the first pilot-operated directional control valve with the first actuator port of the second pilot-operated directional control valve is located within the valve assembly within an input section or end section, or outside of the valve assembly.

8. The redundant hydraulic system according to claim 1, wherein the first and second pilot-operated directional control valves have the same design and functionality.

9. The redundant hydraulic system according to claim 1, wherein the valve assembly is a redundant sectional valve assembly, wherein the first pilot-operated directional control valve is assembled in a first individual work section, wherein the second pilot-operated directional control valve is assembled in a second individual work section, wherein each of the first and second work sections include said inlet port fluidly connected for receiving the high-pressure hydraulic fluid from the hydraulic fluid pressure source, said outlet port fluidly connected for draining the hydraulic fluid to the hydraulic fluid reservoir, said first actuator port fluidly coupled with the first chamber of the hydraulically driven actuator, said second actuator port fluidly coupled with the second chamber of the hydraulically driven actuator, and said pilot operated flow control spool arranged in the spool bore, and wherein said first and second individual work sections are stacked and clamped together to provide the assembled sectional valve assembly.

10. The redundant hydraulic system according to claim 9, wherein the sectional valve assembly further comprises a inlet section and an end section, wherein the inlet section, the first individual work section, the second individual work section and the end section are stacked and clamped together to provide the assembled sectional valve assembly, and wherein the inlet section and/or end section includes an inlet port and an outlet port.

11. The redundant hydraulic system according to claim 10, wherein the first and second pressure reducing valves and the shuttle valve is located in the inlet section.

12. The redundant hydraulic system according to claim 1, wherein the valve assembly is a redundant monoblock valve assembly having a one-piece block with integrally formed inlet port and an outlet port, and with the first and second pilot-operated directional control valves formed either integrally in the block or clamped to a surface of the block.

13. A vehicle comprising wheels and/or crawlers for facilitating movement of the vehicle and a solenoid-controlled control system comprising the redundant hydraulic system according to claim 1, wherein the at least one hydraulic actuator is configured to be used for steering the vehicle.

14. The redundant hydraulic system according to claim 1, wherein the normally closed internal drain passage of each of the first to fourth fail-safe solenoid-controlled pilot valves is configured to automatically open a bypass flow channel from the redundant pilot pressure fluid supply system to a discharge port for enabling automatic drainage of pilot pressure fluid supplied from the pilot pressure fluid supply system in the event a pilot spool of the associated fail-safe solenoid-controlled pilot valve is stuck in an actuated state.

15. A method for operating an hydraulically driven actuator of a redundant hydraulic system, the method comprises:

providing the hydraulic system that comprises a hydraulic actuator; a first pilot-operated directional control valve connected to the hydraulic actuator and a second pilot-operated directional control valve also connected to the hydraulic actuator; first and second fail-safe solenoid-controlled pilot valves operatively connected to the first pilot-operated directional control valve, and third and fourth fail-safe solenoid-controlled pilot valves operatively connected to the second pilot-operated directional control valve;

energizing a solenoid of the first fail-safe solenoid-controlled pilot valve for displacing an associated pilot spool forwards, such that a flow passage opens that supplies pilot pressure fluid from a redundant pilot pressure fluid supply system to a first longitudinal end of a flow control spool of the first directional control valve, and such that high-pressure hydraulic fluid from an external hydraulic fluid pressure source is routed to a first chamber of the hydraulically driven actuator via the first directional control valve, and substantially simultaneously energizing a solenoid of the third fail-safe solenoid-controlled pilot valve for displacing an associated pilot spool forwards, such that a flow passage opens that supplies the pilot pressure fluid from the redundant pilot pressure fluid supply system to a first longitudinal end of a flow control spool of the second directional control valve, and such that the high-pressure hydraulic fluid from the external hydraulic fluid pressure source is routed to said first chamber of the hydraulically driven actuator via the second directional control valve; and stopping energizing the solenoid of the first fail-safe solenoid-controlled pilot valve, and substantially simultaneously stopping energizing the solenoid of the third fail-safe solenoid-controlled pilot valve, wherein subsequent rearwards motion of a plunger of the solenoid of the first fail-safe solenoid-controlled pilot valve automatically causes opening of a normally closed internal drain passage in the first fail-safe solenoid-controlled pilot valve for enabling automatic drainage of the pilot pressure fluid supplied from the pilot pressure fluid supply system in the event the associated pilot spool is stuck in an actuated state, and wherein subsequent rearwards motion of a plunger of the solenoid of the third fail-safe solenoid-controlled pilot valve automatically causes opening of a normally closed internal drain passage in the third fail-safe solenoid-controlled pilot valve in the event the associated pilot spool is stuck in an actuated state, wherein the redundant pilot pressure fluid supply system having a first pilot pressure fluid supply line and a second pilot pressure fluid supply line configured for supplying pilot pressure fluid to the first to fourth fail-safe solenoid-controlled pilot valves, wherein the first pilot pressure fluid supply line is connected to a first input port of a shuttle valve and the second pilot pressure fluid supply line is connected to a second input port of the shuttle valve, and an inlet port of each of the first to fourth fail-safe solenoid-controlled pilot valves is connected to an outlet port of the shuttle valve, and wherein the redundant pilot pressure fluid supply system comprises a first pressure reducing valve configured for supplying the pilot pressure fluid to the first pilot pressure fluid supply line, and a second pressure reducing valve configured for supplying the pilot pressure fluid to the second pilot pressure fluid supply line.

16. A hydraulic system for activating a hydraulic consumer having a first consumer port and a second consumer port, the system comprising:

a valve assembly having a pressure source inlet port, a reservoir port, a first pilot-operated directional control valve and a second pilot-operated directional control valve, each pilot-operated directional control valve including: a first port fluidly connected to the pressure source inlet port, a second port fluidly connected to the reservoir port, a third port fluidly connected to the first consumer port, a fourth port fluidly connected to the second consumer port, and a pilot operated flow control spool arranged in a spool bore, a first fail-safe solenoid-controlled pilot valve operably connected to the first directional control valve and configured for driving the flow control spool in a first direction, a second fail-safe solenoid-controlled pilot valve operably connected to the first directional control valve and configured for driving the flow control spool in a second direction, a third fail-safe solenoid-controlled pilot valve operably connected to the second directional control valve and configured for driving the flow control spool in the first direction, a fourth fail-safe solenoid-controlled pilot valve operably connected to the second directional control valve and configured for driving the flow control spool in the second direction, and a pilot pressure fluid supply system having a first pilot pressure fluid supply line and a second pilot pressure fluid supply line configured for supplying pilot pressure fluid to the first to fourth fail-safe solenoid-controlled pilot valves, wherein each of the fail-safe solenoid-controlled pilot valves has an internal drain passage that is normally closed and is configured to automatically open upon subsequent rearward motion of a plunger of the solenoid of each fail-safe solenoid-controlled pilot valve for enabling automatic drainage of the pilot pressure fluid supplied from the pilot pressure fluid supply system in the event a pilot spool of the associated fail-safe solenoid-controlled pilot valve is stuck in an actuated state, wherein the first pilot pressure fluid supply line is connected to a first input port of a shuttle valve and the second pilot pressure fluid supply line is connected to a second input port of the shuttle valve, and an inlet port of each of the first to fourth fail-safe solenoid-controlled pilot valves is connected to an outlet port of the shuttle valve, and wherein the redundant pilot pressure fluid supply system comprises a first pressure reducing valve configured for supplying the pilot pressure fluid to the first pilot pressure fluid supply line, and a second pressure reducing valve configured for supplying the pilot pressure fluid to the second pilot pressure fluid supply line.

17. The system of claim 16, wherein the valve assembly is a sectional valve assembly.

18. The system of claim 16, wherein the valve assembly is a monoblock valve assembly.

* * * * *